(12) United States Patent
Sensarn

(10) Patent No.: US 11,435,836 B1
(45) Date of Patent: Sep. 6, 2022

(54) TAP AND GESTURE DETECTION USING ACCELEROMETER DATA

(71) Applicant: Amazon Technologies, Inc., Seattle, WA (US)

(72) Inventor: Steven Sensarn, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/340,626

(22) Filed: Jun. 7, 2021

(51) Int. Cl.
*G06F 3/0346* (2013.01)
*G06F 3/01* (2006.01)

(52) U.S. Cl.
CPC ............ *G06F 3/0346* (2013.01); *G06F 3/017* (2013.01)

(58) Field of Classification Search
CPC ............................... G06F 3/017; G06F 3/0346
See application file for complete search history.

(56) References Cited

U.S. PATENT DOCUMENTS

| | | | | |
|---|---|---|---|---|
| 8,937,237 B2* | 1/2015 | Little | ...................... | G06F 3/041 84/609 |
| 8,940,992 B2* | 1/2015 | Little | ...................... | G10H 1/38 84/662 |
| 9,151,777 B2* | 10/2015 | Caritu | ................... | G06F 1/1616 |
| 9,590,986 B2* | 3/2017 | Zizi | ....................... | G06V 40/70 |
| 9,827,420 B2* | 11/2017 | Ferree | ................ | A61N 1/36021 |
| 10,061,911 B2* | 8/2018 | Zizi | ..................... | H04L 63/0807 |
| 10,130,810 B2* | 11/2018 | Ferree | ................ | A61N 1/36021 |
| 10,152,869 B2* | 12/2018 | Peyrard | ................... | G06F 3/013 |
| 10,540,083 B2* | 1/2020 | Goel | ................... | G06F 3/04886 |
| 10,901,529 B2* | 1/2021 | Rivolta | ................. | G06F 1/1643 |
| 10,940,311 B2* | 3/2021 | Gozani | .................... | A61N 1/08 |
| 11,182,946 B2* | 11/2021 | Garofalo | ................. | G06F 3/017 |
| 11,210,834 B1* | 12/2021 | Chamdani | ............ | A61B 5/4561 |
| 2019/0175077 A1* | 6/2019 | Zhang | ..................... | G06F 3/017 |

* cited by examiner

*Primary Examiner* — Gene W Lee

(74) *Attorney, Agent, or Firm* — Pierce Atwood LLP

(57) ABSTRACT

A device that is capable of performing tap detection and other gesture detection using data from an accelerometer. Motion data from the accelerometer is filtered and processed to detect motion. If motion is detected filtered motion data may be processed using a first neural network to detect a tap gesture, which may include one or multiple taps. Motion data may also be processed using a second neutral network to detect other gestures, which may be turned on or off based on a location of the device. Actions may be performed in response to a detected gesture, where the action may be performed by the device or by another device or system.

20 Claims, 13 Drawing Sheets

TAP AND GESTURE DETECTION USING ACCELEROMETER DATA

BACKGROUND

Devices come in many forms, including those that are wearable by users. Wearable devices have been increasing in complexity with many different components such as touch displays, microphones, or the like.

BRIEF DESCRIPTION OF DRAWINGS

For a more complete understanding of the present disclosure, reference is now made to the following description taken in conjunction with the accompanying drawings.

DETAILED DESCRIPTION

Figure 1:
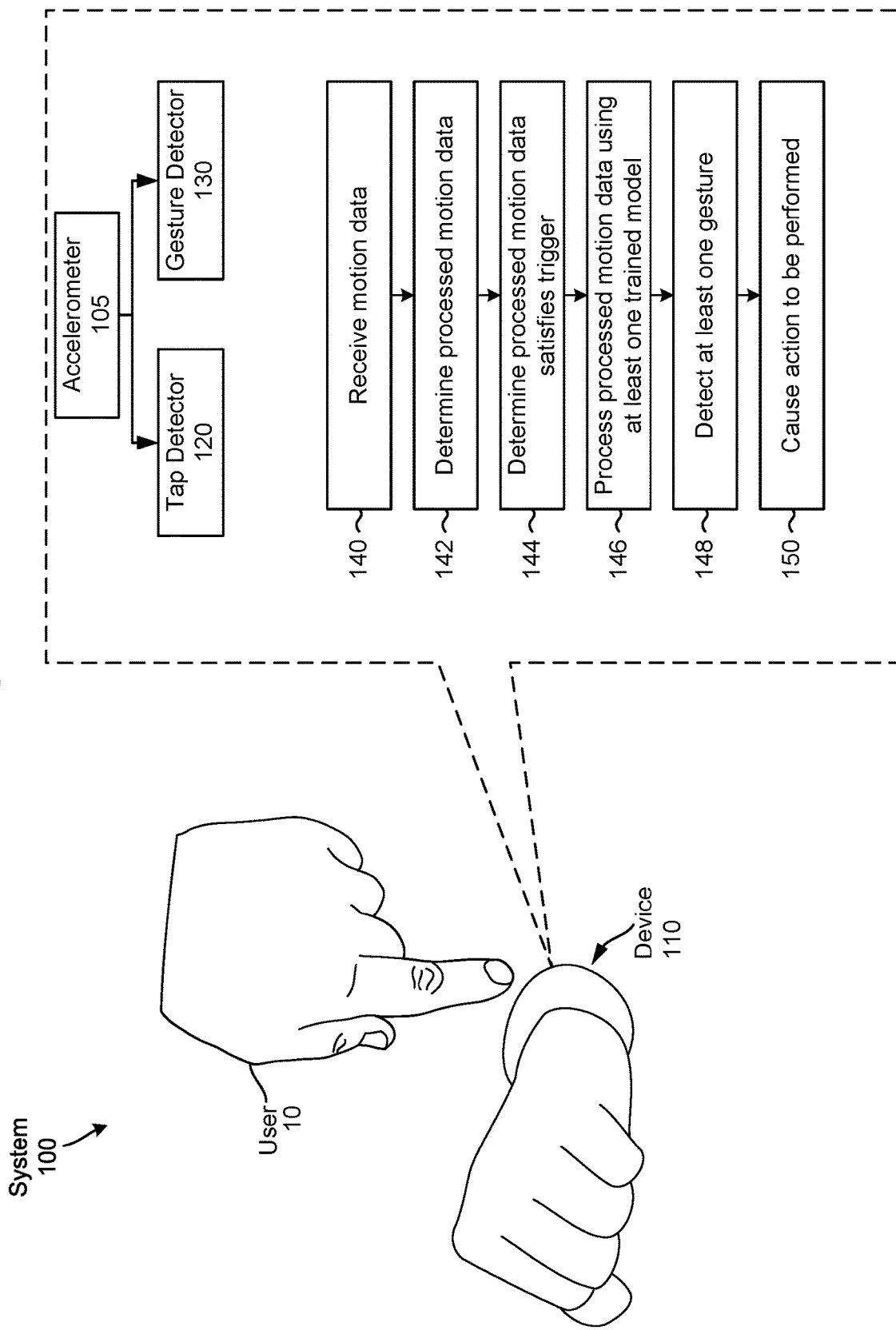
FIG. 1 illustrates a device for detecting physical gestures according to embodiments of the present disclosure.

Devices may be capable of detecting gestures performed by a user. Gestures may include various movements such as waving, raising an arm, punching, nodding, head shaking, tapping a device, etc. Detection of such gestures may result in performing various operations by a device or system such as turning on, controlling a video game, etc.

Gesture detection is a technically complex operation that often involves complex hardware by the device/system performing the gesture detection. For example, to detect a tap gesture (which may include one or more tap inputs) a device may include a touch screen, pressure sensor, or other customized components which a user can tap to allow the system to detect and process the tap input. As another example, to detect a physical motion gesture a system may use cameras and complicated computer-vision components (which may include hardware and/or software) to process image data to determine if a gesture has been performed. As still a further example, certain gestures that involve motion of a device (which may be called motion gestures) may be detected through use of an inertial measurement unit (IMU) or similar component that may measure a body's specific force, angular rate, orientation of the body, or the like using a combination of accelerometers (which measure linear acceleration), gyroscopes (which measure angular acceleration), and sometimes magnetometers (which measure magnetic field).

It is difficult to perform reliable gesture detection without such specific components such as cameras, computer-vision, gyroscopes, pressure sensors, touch screens, or the like. As a result, devices and systems capable of performing gesture detection have had a certain cost, both in terms of monetary cost to manufacture and purchase such devices/systems but also in terms of computing cost (for example in terms of processing power, battery drain, etc.). Lower cost/simpler devices have typically not been able to perform gesture detection in a reliable manner.

Offered is a device and related components to perform reliable gesture detection using simpler measurement components, in particular a three dimensional accelerometer and one or more trained models (which may include neural networks) that can be used to detect a variety of gestures including certain gestures that may always be detectable by the device (referred to as "always on" gestures, such as tap gestures or others) and certain gestures that may be detected by the device under certain conditions (referred to as contextual gestures which may include hand waves, hard pushes, or others).

The device may be configured with an accelerometer and a microcontroller (e.g., processor) capable of running customized controls and trained models to detect gestures using the output from the accelerometer. The accelerometer may measure linear acceleration about three dimensions (e.g., x-, y-, and z-axis). As described herein, data output from the accelerometer may be filtered and processed (for example by one or more trained models/neural networks such as a convolutional neural network (CNN)) to detect when a gesture has been performed.

As noted herein the device may include, or may be included within, a wearable device such as a wristband or other such device, but other device configurations are also possible. Due to the relative simplicity of the device and its components, the device may be relatively low cost both in terms of monetary cost to manufacture and in terms of processor/battery drain during operation. This allows the device to be placed within lower cost items such as an amusement park or museum wristband and also allows the device to perform gesture detection for significantly longer periods of time without battery recharging or replacement. As can be appreciated, while such a device may be a stand-alone device it may also be included as a component in a larger or more complex device allowing such a device to perform gesture detection using the techniques herein while also performing other tasks.

The device may include multiple trained models where each may be configured to detect one or more gestures. For example, a device may include one trained model to detect always-on gestures and another trained model to detect contextual gestures, which may include motion gestures.

This configuration may allow the device to conserve power by only operating a contextual gesture detector during situations where such detectable gestures are in an active state, for example when the device is at a particular location. As noted, the device detects gestures using data output from an accelerometer, called accelerometer data or motion data. The device may detect gestures using raw motion data and/or processed motion data. One benefit to processing the motion data prior to operation is that the processing may perform actions such as filtering the motion data (for example to remove low frequency portions and/or noise), downsampling the motion data (which may result in less data being processed to detect a gesture), and/or other processing.

FIG. 1 illustrates a device for detecting physical gestures according to embodiments of the present disclosure. As shown, the device may include an accelerometer 105. The device may also be configured with a component 120 to detect always-on gestures. As shown in FIG. 1, this may be referred to as a tap detector 120 in situations where the always-on gestures include tap gestures. A tap gesture may include, for example, a single tap input, double tap input, triple tap input, or the like. As explained further below in reference to FIGS. 2 and 3, tap detector 120 may include a trained model (such as a CNN or other model) that is configured to process motion data to determine if a tap gesture has been performed. The device may also be configured with a component 130 to detect contextual gestures, which may include motion gestures. As shown in FIG. 1, this may be referred to as a gesture detector 130. The device 110 may be configured to use the gesture detector 130 to detect certain gestures at certain times (for example, when such gestures are determined to be in an active state) and to not detect gestures when such gestures are in an inactive state. As explained herein, certain gestures may be activated under certain conditions, such as when gestures are activated by a user, when the device 110 is in a particular location, and/or when gesture activation is otherwise triggered.

As shown in FIG. 1, the device 110 may receive (140) motion data. Such motion data may be received directly from an accelerometer 105. The device 110 may determine (142) processed motion data. Processed motion data may include filtered motion data (such as that determined as described below in reference to FIGS. 2 and 3), downsampled motion data (such as that determined as described below in reference to FIGS. 4-10), or other processed motion data. The device 110 may determine (144) that the processed motion data satisfies a trigger such as an amplitude/motion trigger/threshold as discussed herein. The device 110 may also buffer processed motion data before processing the processed motion data by the at least one model. Such buffering is not shown in FIG. 1 but is discussed below.

The device 110 may also process (146) processed motion data using at least one trained model, for example a tap detector CNN 220 and/or a gesture detector CNN 420. The processed motion data used to determine satisfaction of the trigger may be the same as or different from the processed motion data processed by the at least one trained model. For example, as described below the processed motion data used to determine satisfaction of a trigger may be filtered differently from that processed by a model. The processed motion data processed by a model may also be encoded before processing. The device 110 may detect (148) at least one gesture, for example by processing the output of the at least one trained model, for example by a tap manager 222, gesture manager 422, or other component. The device 110 may then cause (150) an action to be performed based on the detected gesture. This may comprise sending a signal to another component (such as another device a system 100 in communication with the device 110), activating an output component on the device 110 (such as a light, haptic output, beep, or the like), or other output.

Figure 2:
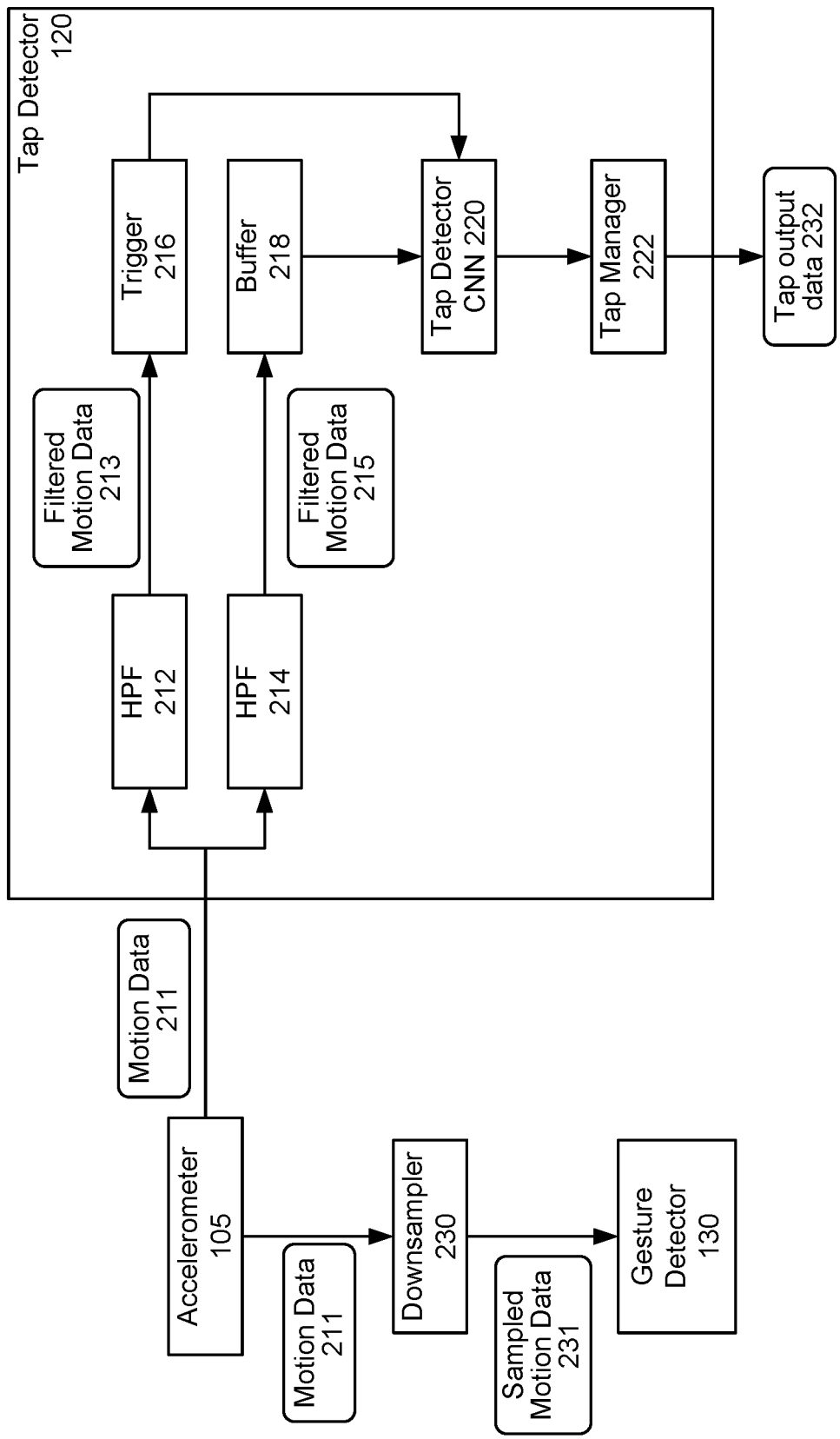
FIG. 2 illustrates components for operating of a tap detector of a device using accelerometer data according to embodiments of the present disclosure.
Figure 3:
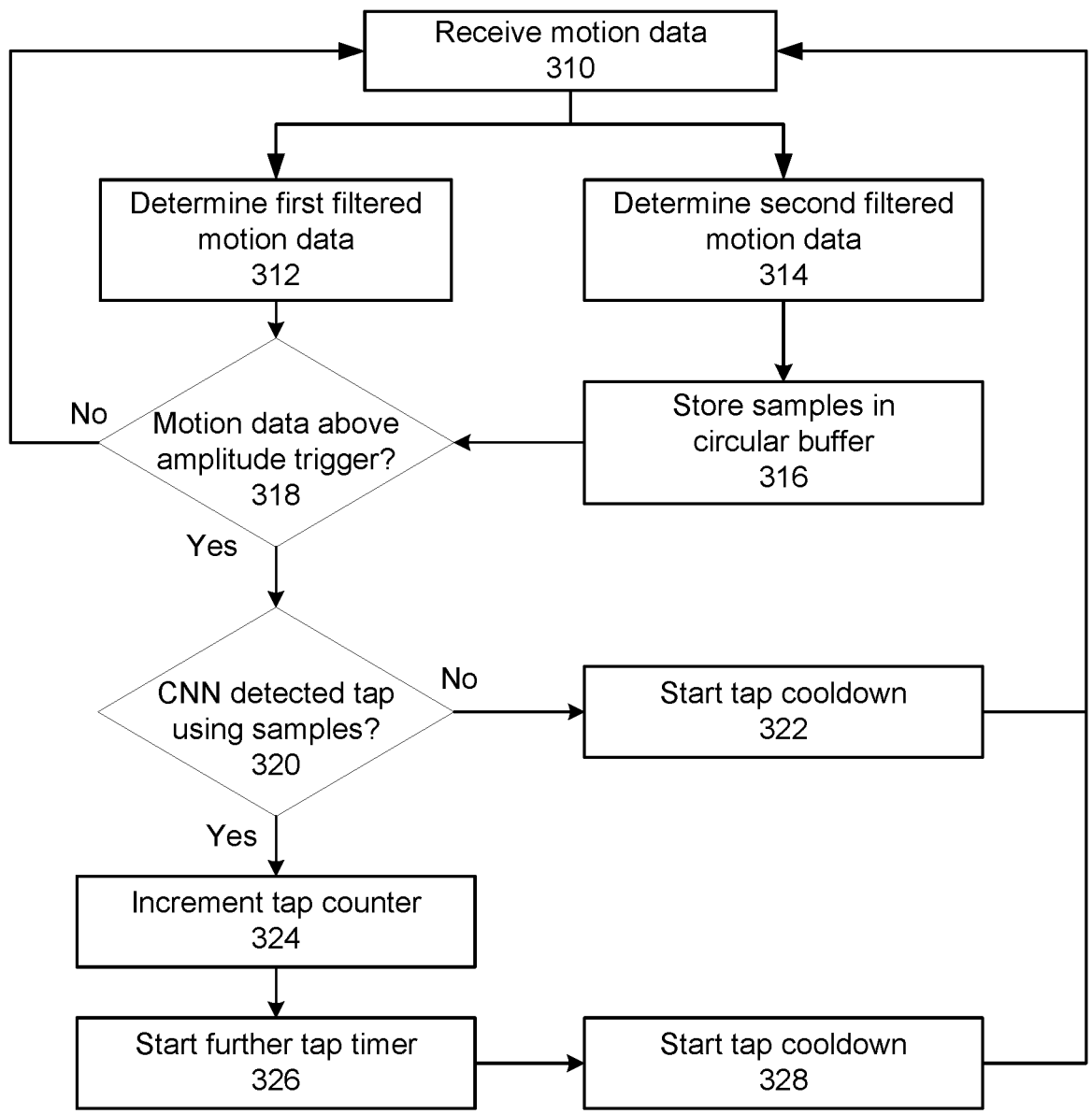
FIG. 3 illustrates performing tap detection by a device using accelerometer data according to embodiments of the present disclosure.

As noted, the device 110 may be capable of detecting always on gestures and contextual gestures. As noted, the device 110 may offer different components and processing techniques to handle always on versus contextual gestures, though both may rely on output from the accelerometer 105. FIG. 2 illustrates components for operating of an always on detector of a device using accelerometer data according to embodiments of the present disclosure. FIG. 3 illustrates performing detection for an always on gesture by a device using accelerometer data according to embodiments of the present disclosure.

As discussed herein, the device 110 may be configured to detect tap gestures as part of an always on detector. Thus tap gestures are used as the primary example for an always on detector, though the device 110 may be configured to detect other gestures using similar components and/or operations. As such, always on detection is described in reference to tap detection as discussed below in reference to FIGS. 2 and 3.

As shown in FIG. 2, an accelerometer 105 detects motion/acceleration of a device and outputs motion data 211. The accelerometer may be a 3-axis accelerometer that measures linear acceleration about three dimensions (e.g., x-, y-, and z-axis). Accordingly the motion data 211 may represent motion in those three axes. The motion data 211 may also correspond to a particular sample rate and a particular bit rate of the accelerometer 105, for example 400 Hz with 14-bit resolution. That raw motion data 211 may be output to a downsampler 230 which creates sampled motion data 231 which in turn is output to the gesture detector 130. This may be due to the gesture detector 130 being able to operate well with a lower sample rate (for example 50 Hz). The raw motion data 211 may also be output to a tap detector 120, though motion data 211 may also be downsampled prior to output to the tap detector 120 if the system is appropriately configured.

The tap detector 120 may be configured to detect a tap gesture made to the device 110, for example a user tapping a wristband. The tap gestures may include one or more tap inputs. For example, a tap gesture may include a single tap, a double tap (e.g., two tap inputs being made to the device 110 within a certain time period), a triple tap (e.g., three tap inputs being made to the device 110 within a certain time period), or the like. To detect the tap inputs, the tap detector 120 seeks to detect a clean acceleration spike that is unencumbered by noise or false accepts caused by non-tap movements of the device. To reduce the likelihood of the false accept or improper tap input detection, the tap detector 120 may include a two high-pass filter structure. As shown in FIGS. 2 and 3 the tap detector 120 may employ a first high-pass filter (HPF) 212 that receives (310) the motion data 211 and determines (312) first filtered motion data 213. The tap detector 120 may also employ a second HPF 214 that receives (310) the motion data 211 and determines (314) second filtered motion data 215. The first filtered motion data 213 may be processed by a trigger 216 to determine (318) if the motion data includes data above an amplitude trigger, which would result in an attempt to detect a tap input. The second filtered motion data 215 may be stored by a buffer 218 for eventual processing by downstream component(s) to determine whether a tap input is detected.

The amplitude trigger may comprise a threshold motion amplitude/value configured to indicate a significant amount of motion detected by the accelerometer 105. The amplitude trigger may correspond to an absolute value of motion and/or may correspond to a particular amount of motion in one or more specific axes. The amplitude trigger may be configured to a value such that only a significant amount of motion detected by accelerometer 105 will result in an attempted tap input detection, for example by tap detector CNN 220. The amplitude trigger may only be applied to first filtered motion data 213 and thus may not be relevant to any motion data below the cutoff frequency of HPF 212, but this may depend on system configuration.

The first HPF 212 may have a different cutoff frequency from the second HPF 214. (Alternatively, the HPFs may have the same cutoff frequency, in which case the tap detector 120 may only include a single HPF). Specifically the first HPF 212 may have a higher cutoff frequency from the second HPF 214. This is because it may be desirable for the tap detector 120 to remove more of the lower frequency motion to remove from consideration by the amplitude trigger, typical human motion such that only sharper, high-amplitude signals trigger a tap evaluation by the other components of the tap detector. However, because it may be desirable to preserve some of the normal human motion/ lower frequency motion data for purposes of evaluation by such other, in particular the trained model/tap detector CNN 220, the data used by the tap detector CNN 220 (which is stored in buffer 218) may be obtained from the second HPF 214, which has a lower cutoff frequency and thus preserves more of the raw motion data 211 than the first HPF 212.

The second HPF 214 may have a cutoff frequency that is low enough to be able to detect a steady hand as such detection may be desired to reduce false tap input detections by the tap detector CNN 220. For example, if a hand is moving rapidly, it may be unlikely that a user is intentionally tapping a device. In one embodiment, for example, the cutoff frequency for the first HPF 212 may be 20 Hz and the cutoff frequency for the second HPF 214 may be 10 Hz, but such values are configurable. Thus the data that is considered by the trained model 220 may include more information than the data considered by the trigger component 216, even if the trained model 220 may not actually operate on its data until a condition is satisfied as determined by the trigger component 216.

As illustrated, the first filtered motion data 213 output by the first high pass filter 212 may be processed by a trigger component 216 to determine (318) if the motion data is above an amplitude trigger. If the motion data is not above an amplitude trigger (318:No), the device 110 may continue to process motion data as discussed without triggering a tap input detection analysis. If the motion data is above the amplitude trigger (318:Yes), the device 110 may determine if (320) a trained model detects a tap input using the buffered samples. The specific amplitude trigger is configurable by the system but may be a threshold value that is stored by the device 110. The trigger component 216 may also be configured to use different threshold values where at least one tap input in a tap gesture must exceed a higher threshold to prevent an error in gesture detection for double and triple taps as compared to single taps. In one example, the amplitude trigger may correspond to approximately 1G of acceleration as represented in the magnitude (e.g., L2 norm) of the first filtered motion data 213. As described herein, first filtered motion data 213 may include a different frequency range of motion data than the second filtered motion data 215.

As illustrated, the second filtered motion data 215 output by the second high pass filter 214 is stored (316) in a buffer 218. Buffer 218 may be a circular buffer in which new data is regularly replacing older data. The size of the buffer 218 is configurable, but in one example may include approximately 60 samples, which at a 400 Hz sample rate may correspond to 150 ms of motion data. Each sample of motion data may contain one or more channels which may represent raw motion data and/or feature data that is determined by one or more components (not shown) that may process the motion data to determine the feature data. For present purposes, such feature data may also be considered motion data (or processed motion data, filtered motion data, etc.) when describing system operation herein. The data stored in the buffer 218 may be configured for processing by at least one trained model configured to detect a tap input.

The device 110 may be configured to allow the buffer 218 to store a certain number of samples prior to sending the buffered data for evaluation. For example, it may be desirable for the tap detector 120 to process the signals surrounding a high amplitude when determining whether a tap occurred. Thus, if an amplitude trigger is detected, the desired data for purposes of determining a tap input may be the motion data both before, during, and after an amplitude spike. Thus the tap detector 120 may be configured to wait until the amplitude peak is at the center of the buffer 218 prior to engaging the trained model 220. Thus, for example if the buffer size is 60 samples at sample rate of 400 Hz, the buffer includes about 150 milliseconds worth of motion data. The tap detector 120 may thus wait after detecting the amplitude trigger for the buffer to include an additional 30 samples (e.g., 75 milliseconds worth of data) prior to initiating inference by the trained model 220. The device 110/tap detector 120 may also pre-process the buffered data prior to attempting tap input detection, for example to perform normalization, standardization, or the like. The device 110 may thus determine a peak amplitude value within the first filtered motion data 213, where the peak amplitude value is at a certain point within the data range of the first filtered motion data 213. The device 110 may then delay processing of the second filtered motion data 215 (stored in buffer 218) by the tap detector CNN 220 based on a delay period (e.g., 75 milliseconds) corresponding to the peak amplitude's position within the data range.

The at least one trained model to detect a tap input may include a tap detector CNN 220, though other neural network, model, or other configuration may be used. For illustration purposes, operation of the tap detector 120 will be illustrated with regard to the tap detector CNN 220. The tap detector CNN 220 may be trained to discriminate real taps from a variety of false activities like clapping hands, waving an arm, scratching a head, eating, shaking hands, repositioning a wearable device, or the like. The data used to train the tap detector CNN 220 may include many different examples of tap inputs and non-tap inputs as gathered from training operations resulting from the use of training devices by many different individuals of different age ranges, under different situations, wearing different devices on different hands, and under a variety of other conditions.

The output of the tap detector CNN 220 (which may include data indicating the likelihood a tap was detected) may be processed by the tap manager 222. The tap manager 222 may operate a quasi-state machine or perform other operations to determine when a detected tap input corresponds to a tap gesture, when multiple tap inputs combined result in a multi-tap gesture (e.g., a double-tap), or when a gesture is concluded. For example, the tap manager 222 may track how long it has been since a previous tap input, if a second (or third) tap input is detected within a certain time window of a previous (e.g., first or second) tap, manage a tap counter (for example by incrementing or clearing the tap counter), and/or performing other operations.

For example, after the tap detector 120 determines that the motion data is above the amplitude trigger (318:Yes), the tap detector 120 may determine if (320) a trained model detects a tap input using the buffered samples. For example, the tap manager 222 may review the data output by the tap detector CNN 220 to determine if a tap input is detected. For example, the tap manager 222 may compare a score output by the tap detector CNN 220 to a threshold. If the score exceeds the threshold, the tap manager 222 may determine that a tap input has occurred. Alternatively, the output of the tap detector CNN 220 may simply be a binary indicator that a tap input was detected. If a tap input was not detected (320:No) the tap manager 222 may start a tap cooldown 322 during which the amplitude trigger may be disabled to avoid restarting processing by the tap detector CNN 220. Such a cooldown limits the number and frequency of CNN inferences. The time of the cooldown is configurable. If a tap input was detected (320:Yes) the tap manager 222 may increment a tap counter (324) and start a further tap timer 326. This timer may count down a certain time period to determine if a further tap input is detected within a certain time period, in which case the further tap input may be considered part of a same tap gesture as a previous tap input. If another tap input is detected prior to expiration of the tap timer, the tap manager 222 may again increment the tap counter 324 and restart the further tap timer 326.

The tap manager 222 may also start a tap cooldown 328. The tap cooldown 328 may be of a different length from the tap cooldown 322 because a true detected tap input may require a longer down time between tap inputs which may result in double or triple tap gestures. If the tap timer expires (e.g., a further tap input was not detected within a certain time period), the tap manager 222 may refer to the tap counter to determine its value (e.g., 1, 2, 3, etc.) and based at least in part on the tap counter may determine that a tap gesture has occurred. For example, if the tap counter has a value of 1, the tap manager 222 may determine that a single tap gesture has occurred; if the tap counter has a value of 2, the tap manager 222 may determine that a double tap gesture has occurred; the tap counter has a value of 3, the tap manager 222 may determine that a triple tap gesture has occurred; etc. The tap counter may have a maximum value, depending on configuration of the device 110. The tap manager 222 may then output tap output data 232 which may be an indicator of the tap gesture that has occurred. The tap manager 222 may also clear/reset the tap counter to allow the device 110 to detect a new tap gesture.

Thus the tap manager may determine whether a particular detected tap input may be considered part of a tap gesture by detecting a tap input, waiting a period of time (which may be a configurable number of milliseconds), and if another tap input (or tap inputs) is/are detected may determine the tap gesture corresponding to the number of tap inputs. The precise detected tap gesture may be communicated to another device (for example as part of system 100) for execution of further action. The detected tap gesture may also result in particular action by the device, for example, a beep, light output, haptic output, etc.

Although the discussion herein focuses on detection of tap inputs and tap gestures using motion data, the present configuration may be used generally to detect touch gestures which may include one or more touch inputs such as a gentle touch, a tap, or an even more forceful touch. The differences between such touch inputs may be characterized by the level of force applied to the device 110 during the touch input. Thus, force in one range may be considered a gentle touch input, force in a more forceful range may be considered a medium touch input (e.g., a tap input), and force in a still a more forceful range may be considered an even more forceful touch input. As can be appreciated, different categories of touch inputs may be detected by the device 110 using components and techniques described herein. The components and techniques described herein may also be used to detect multiple touch gestures such as a double-touch gesture, triple-touch gesture, etc.

As noted, the device 110 may also be configured to detect a number of gestures whose detection may only be performed when the particular gesture is activated. While the number and type of gestures are configurable, example gestures that may be detected by a device 110 that is worn by a user, for example as part of a wristband, may include, but is not limited to a quick hand raise, a quick forward push, a quick backward pull, a quick punch to the left, a quick punch to the right, waving, making circles with a hand, simulating a fishing cast, a diagonal motion, a slash Z, etc. Depending on the circumstances of the user, it may be desirable to activate detection of certain gestures and not others. For example, if a user is at an amusement park and is engaging with an attraction, only a group of gestures may be relevant to that particular attraction. Such gestures may be activated by a user command for example a tap gesture on the device 110 that indicates to the device 110 that a certain gesture or group of gestures are to be activated. Another example is the user operating a mobile device that sends a command to the device 110 to activate a gesture or group of gestures. Another example is the device may include a sensor (such as a radio frequency identification (RFID) tag 1252 discussed below) which is detected by a sensor in a room, location, kiosk (such as kiosk 1250 discussed below) or other sensor. This may trigger a communication to the device 110, such as through antenna 1322 using near field communication (NFC) technology, Bluetooth low energy (BLE), or other communication protocol to activate a gesture or group of gestures. In another example, a combination of such techniques may be used such as the device detecting it is at a particular location, then detecting a user tap gesture, and then activating a gesture or group of gestures that matches the particular tap gesture and location. If a particular gesture is active and detected by the gesture detector 130, the device 110 may perform an action related to the detected gesture, such as outputting an indicator, or communicating (for example through antenna 1322) to another device or system that the gesture was detected to allow the other device/system to execute further commands (such as playing certain music, displaying graphics, crediting a user account, or a variety of other options).

Figure 4:
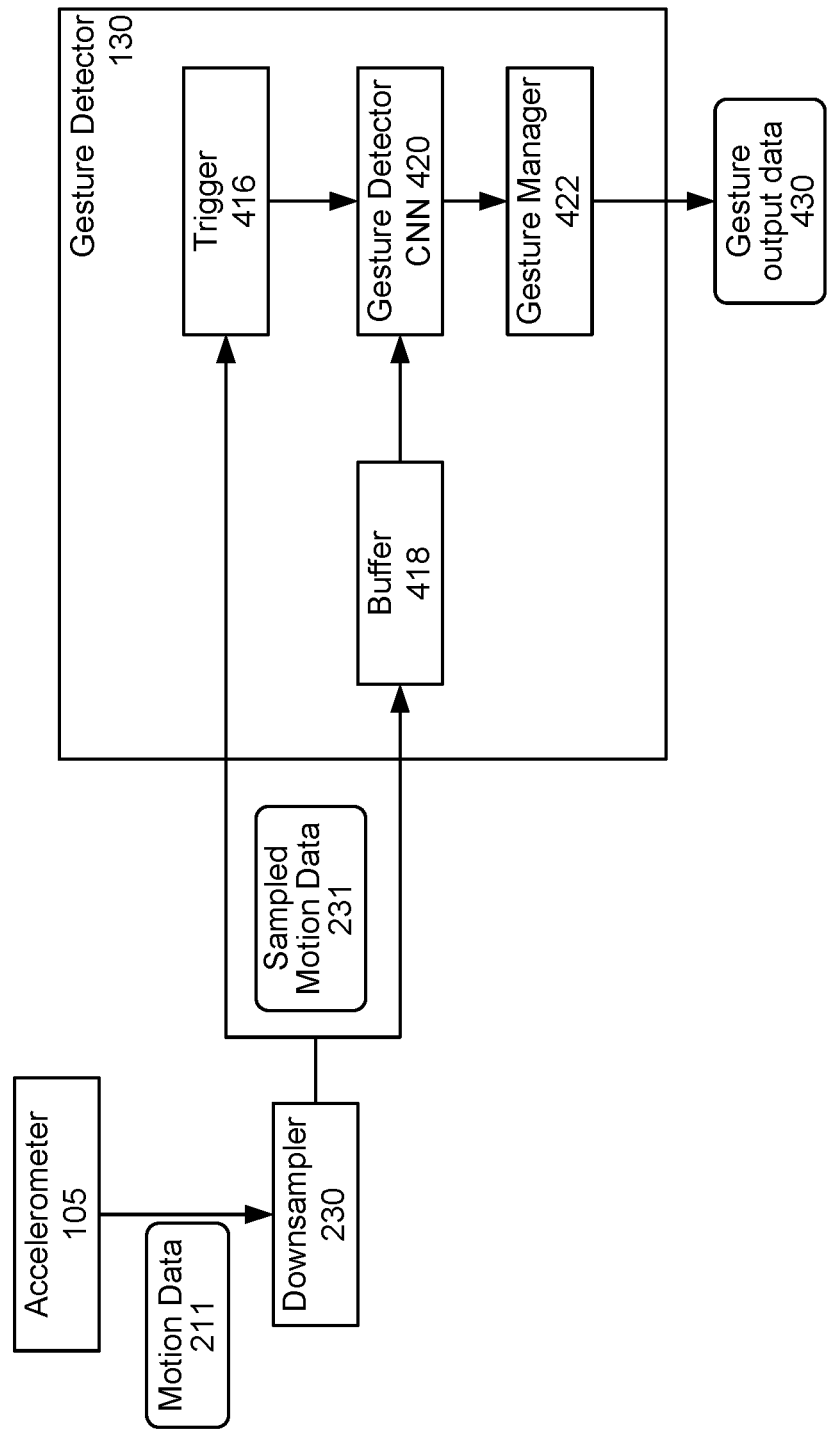
FIG. 4 illustrates components for operating of a gesture detector of a device using accelerometer data according to embodiments of the present disclosure.
Figure 5:
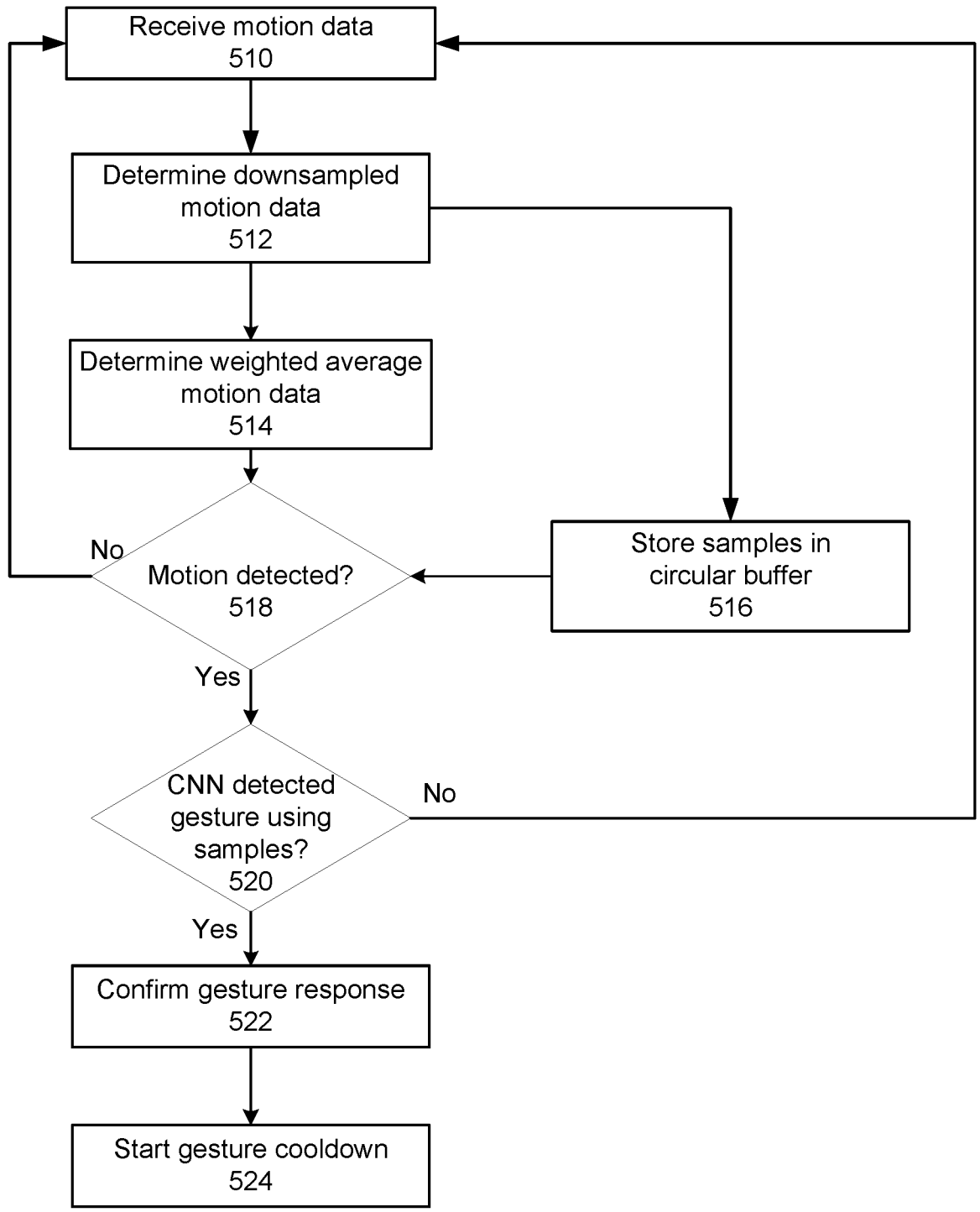
FIG. 5 illustrates performing gesture detection by a device using accelerometer data according to embodiments of the present disclosure.

FIG. 4 illustrates components for operating of a gesture detector of a device using accelerometer data according to embodiments of the present disclosure. FIG. 5 illustrates performing gesture detection by a device using accelerometer data according to embodiments of the present disclosure. As shown in FIGS. 4 and 5, an accelerometer 105 may output motion data 211. The sampling rate for the raw motion data 211 may be higher than is needed for the gesture detector 130 to perform desired gesture detection. Thus, to reduce the processing load to analyze the motion data, the device 110 may downsample the motion data to a sample rate that is high enough to perform gesture detection by the gesture detector 130 but also is low enough to reduce the computing resources used by the gesture detector. Accordingly, the raw motion data 211 may be received (510) by a downsampler 230. The downsampler 230 may determine (512) downsampled motion data 231 and send it to the gesture detector 130. (Alternatively, the device 110 may not include a downsampler 230 and may not downsample the data depending on system operation and configuration.) Alternatively, or in addition, the device 110 may also include one or more blocks (not shown) to operate on the downsampled data 231 (for example to filter the downsampled motion data 231) in some manner before processed by the gesture detector 130.

The gesture detector 130 may store (516) samples of the downsampled motion data in a buffer 418. The size of the buffer 418 is configurable, but in one examples may include 32 samples, 20 samples, or some other amount to balance detection accuracy and power consumption. Thus if the trained model 420 that will analyze the buffered data may require a certain amount of time's worth of motion data, the buffer 418 may be configured to store that amount of time's worth of motion data (which may in turn depend on the downsampling rate). For example, if the buffer 418 may store 150 samples, this may correspond to three seconds worth of motion data for downsampled motion data 231 corresponding to 50 Hz. The buffer 418 may be a circular buffer that overwrites old data with new data as it is received. Each sample of motion data may contain one or more channels which may represent raw motion data and/or feature data that is determined by one or more components (not shown) that may process the motion data to determine the feature data. For present purposes, such feature data may also be considered motion data (or processed motion data, filtered motion data, etc.) when describing system operation herein.

The gesture detector 130 may determine (514) weighted average motion data using the downsampled motion data 231. Such weighted average motion data may include an exponentially weighted moving average (EWMA) on an amplitude metric, e.g., L1 norm. This weighted average motion data may serve as a rough indicator as to when motion is detected sufficient to activate the gesture detector trained model 420. The trigger 416 may thus use the weighted average motion data to determine if motion is detected 518, which may depend on the EWMA magnitude exceeding a motion threshold value. If the EWMA magnitude does not exceed the motion threshold value/motion is not detected (518:No), the device 110 may continue to collect motion data as normal and not activate the gesture detection trained model 420. If the EWMA magnitude does exceed the motion threshold value/motion is detected (518:Yes), the device 110 may enable inference by the gesture detection trained model 420. By including an initial motion detector prior to attempting gesture inference (rather than running gesture inference constantly), the device may save on its computing resources as a user may often be stationary or otherwise not engaging in sufficient motion to invoke gesture detection operations, which may drain a battery, etc.

The trigger described in reference to FIG. 4 may operate in a similar manner to the amplitude trigger discussed above in reference to FIG. 5. Thus the trigger may comprise a threshold motion amplitude/value configured to indicate a significant amount of motion detected by the accelerometer 105. The amplitude trigger may correspond to an absolute value of motion and/or may correspond to a particular amount of motion in one or more specific axes. The amplitude trigger may be configured to a value such that only a significant amount of motion detected by accelerometer 105 will result in an attempted gesture detection, for example by gesture detector CNN 420.

The gesture detection trained model 420 may include one or more trained models configured to detect gestures using motion data of the device 110. As illustrated in FIG. 4, the trained model may include a gesture detector CNN 420, though the disclosure is not limited to a CNN and a different component/trained model may be used. If inference is to be performed, data may be copied from the buffer 418 into the input segment of the gesture detector CNN 420. The device 110/gesture detector 130 may also pre-process the buffered data prior to loading the data into the gesture detector CNN 420, for example to perform normalization, standardization, or the like. The gesture detector CNN 420 may then process (520) the input motion data (e.g., from buffer 418) to determine if a gesture is detected. If a gesture is not detected (520:No) the device 110 may continue receiving (510) motion data as normal. If a gesture is detected (520:Yes), indicating of the detected gesture may go from the gesture detector CNN 420 to the gesture manager 422 which may confirm (522) the gesture response.

The gesture detector CNN 420 may use a stepping window technique to detect a gesture. For example, the gesture detector CNN 420 may operate on the buffered motion data, which may represent 3 seconds worth of motion data, and then operate again on another buffer's worth of motion data, which may be another three seconds worth of motion data, where the two different windows of motion data overlap by a certain time, for example half a second. If a gesture is detected based on the motion data the gesture detector CNN 420 will output an indication of the same (which may include a binary indicator, a score for each gesture indicating a likelihood the gesture was detected, or the like) to gesture manager 422.

The gesture detector CNN 420 may include a multi-class/universal classifier trained to process motion data and to determine if the motion data represents or does not represent one or more of a plurality of gestures. The particular and number of gestures the gesture detector CNN 420 is trained to detect is configurable. The gesture detector CNN 420 may be trained on data that includes many different examples of gestures and non-gestures as gathered from training operations resulting from the use of training devices by many different individuals of different age ranges, under different situations, wearing different devices on different hands, and under a variety of other conditions. The gesture detector CNN 420 may be configured to recognize any gestures that it is trained to recognize, even if such gestures may not be active at a particular time. The gesture manager 422 may track which gestures are active and if the gesture detector CNN 420 indicates detection of a gesture that is not active, the gesture manager 422 may simply ignore that detection and take no further action, whereas detection of an active gesture may result in the gesture manager 422 taking further action such as confirming (522) the gesture response and outputting gesture output data 430 indicating detection of the active gesture.

Although illustrated as a single trained model/gesture detector CNN 420, the gesture detector 130 may include multiple different gesture detection trained models that may be trained to detect certain subsets of gestures and which may be activated in turn depending on which subsets of gestures are to be activated. This divided arrangement may be desirable in certain circumstances while in other circumstances, it may be desirable to have the single trained model arrangement as a model trained to differentiate between multiple gestures may perform better at avoiding false inference results.

In order to improve efficiency and reduce use of computing resources, the various models used by device 110 (e.g., tap detector CNN 220, tap manager 222, gesture detector CNN 420, gesture manager 422, etc.) may comprise quantized models of originally trained models. For example, an original model may be trained so that the internal structure/layers are configured to operate using floating point numbers, which may be relatively unconstrained in terms of use of computing resources at runtime. To reduce the runtime use of computing resources the original model may be compressed/quantized so that its internal structure/layers are configured to use values of a smaller size, for example a single byte. This may result in the models that are deployed on device 110 being significantly smaller (for example, four times smaller) than originally trained models which in turn results in memory savings for storing the models as well as increases in processing speeds when operating the models during inference/runtime.

One potential drawback to using quantized models is that certain operations may be performed with less precision/sensitivity than with full floating point models. This may occur, for example, with gesture detector CNN 420, in particular with the output of its softmax layer 1006. Thus a quantized gesture detector CNN 420 may effectively output either a maximum value to indicate a gesture was triggered or a zero to indicate the gesture was not triggered, but with little variation in between to account for a potential (but not certain) detection of a gesture. This may interfere with the ability to perform certain fine tuning. To avoid such a scenario, the softmax layer 1006 may be configured to output data at a higher resolution (e.g., 16 bits instead of 8 bits) than that of other layers of the gesture detector CNN 420. Further, an operation such as temperature scaling may be used. This is a known technique for calibrating neural networks to adjust the scaling of the softmax such that the output of the softmax more closely represents a probability a particular gesture was detected. The value that is input into the softmax layer may be divided by a constant which may be adjusted to normalize the output to match a confidence. For purposes of a quantized model with a single bit input to the softmax layer, the input to softmax layer (e.g., the quantized value) may be first be right-shifted prior to processing by the softmax.

Figure 6A:
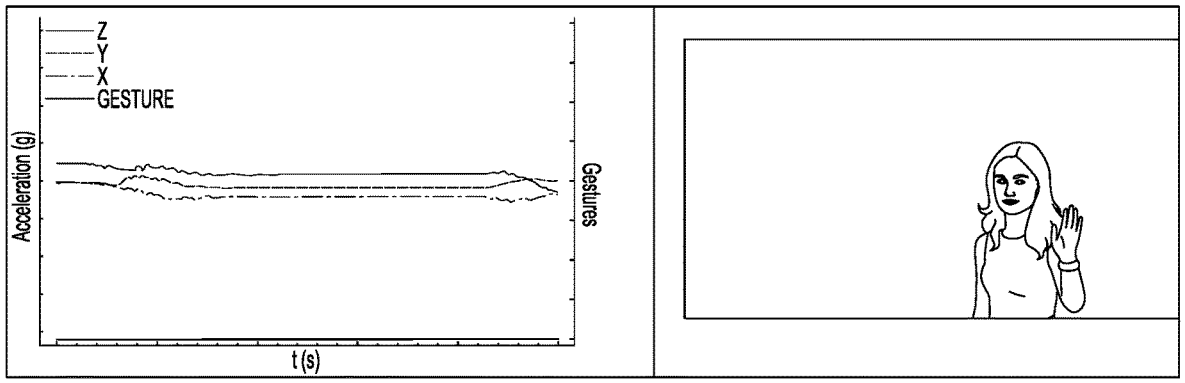
FIGS. 6A-6C illustrate operation of an accelerometer and gesture detector when detecting a hand raise gesture according to embodiments of the present disclosure.
Figure 6B:
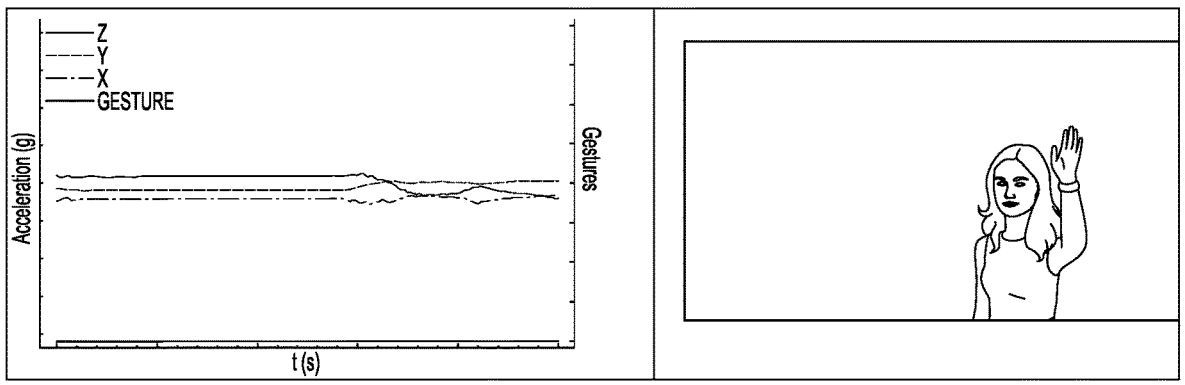
Figure 6C:
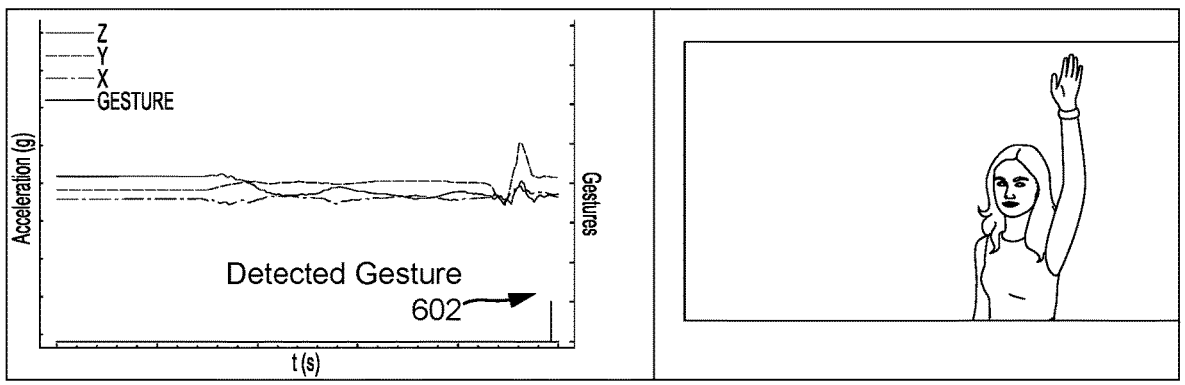

FIGS. 6A-9C illustrate examples of the relationship between motion data and gesture detection. FIGS. 6A-6C illustrate operation of an accelerometer and gesture detector when detecting a hand raise gesture according to embodiments of the present disclosure. As can be seen, in FIG. 6A the user is beginning to raise her hand and the accelerometer captures motion data in three-axes shown on the left-hand side of the figure. As the user continues to raise her hand as shown in FIGS. 6B and 6C, the accelerometer captures the corresponding motion data. Once the data is sufficient for the gesture detector CNN 420 to detect a hand-raise gesture, it will output an indicator of the detected gesture 602. As shown on the right hand side of the graph, the vertical bar to the first hash mark represents the gesture detector CNN 420 outputting the indicator that the hand-raise gesture was detected.

Figure 7A:
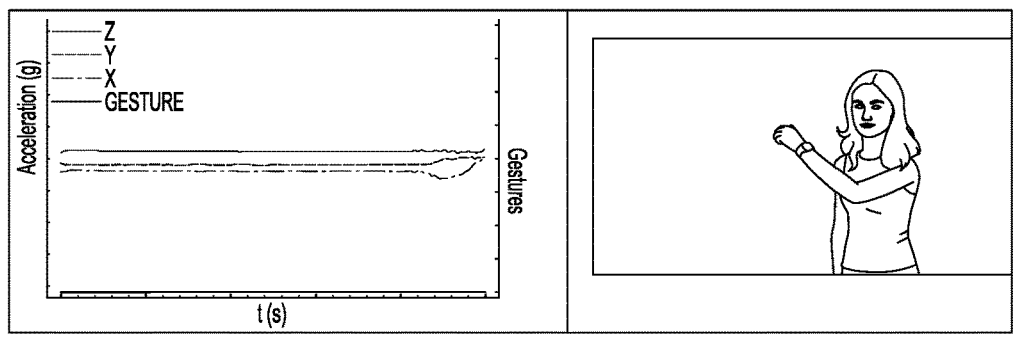
FIGS. 7A-7D illustrate operation of an accelerometer and gesture detector when detecting a z-motion gesture according to embodiments of the present disclosure.
Figure 7B:
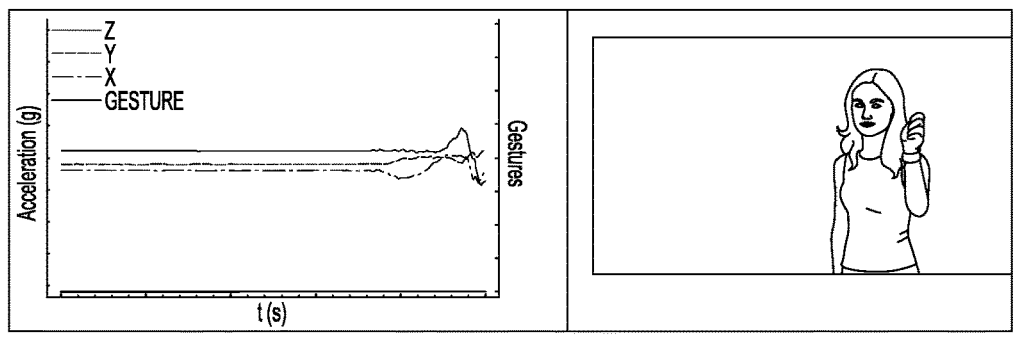
Figure 7C:
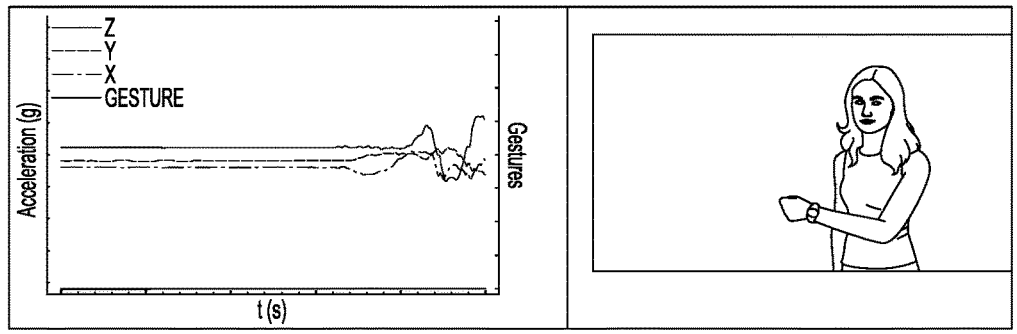
Figure 7D:
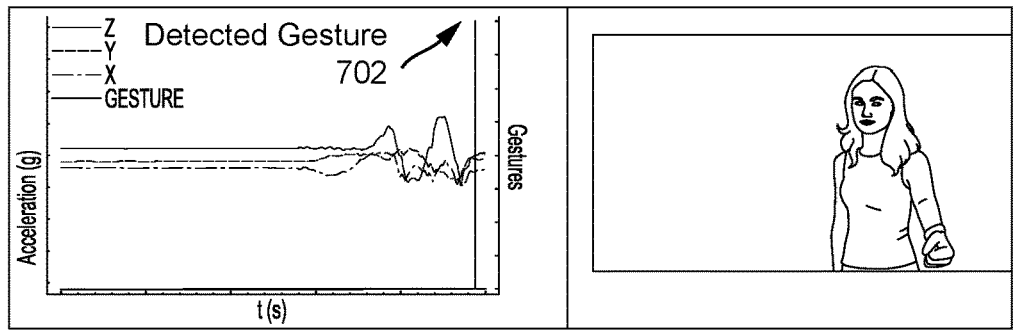

FIGS. 7A-7D illustrate operation of an accelerometer and gesture detector when detecting a z-motion gesture according to embodiments of the present disclosure. As can be seen, in FIG. 7A the user is beginning to move her left arm to the right and the accelerometer captures motion data in three-axes shown on the left-hand side of the figure. As the user continues to move her arm hand as shown in FIGS. 7B-7D, the accelerometer captures the corresponding motion data. Once the data is sufficient for the gesture detector CNN 420 to detect that the user has completed a z-motion gesture, it will output an indicator of the detected gesture 702. As shown on the right hand side of the graph, the vertical bar to the top hash mark represents the gesture detector CNN 420 outputting the indicator that the z-motion gesture was detected.

Figure 8A:
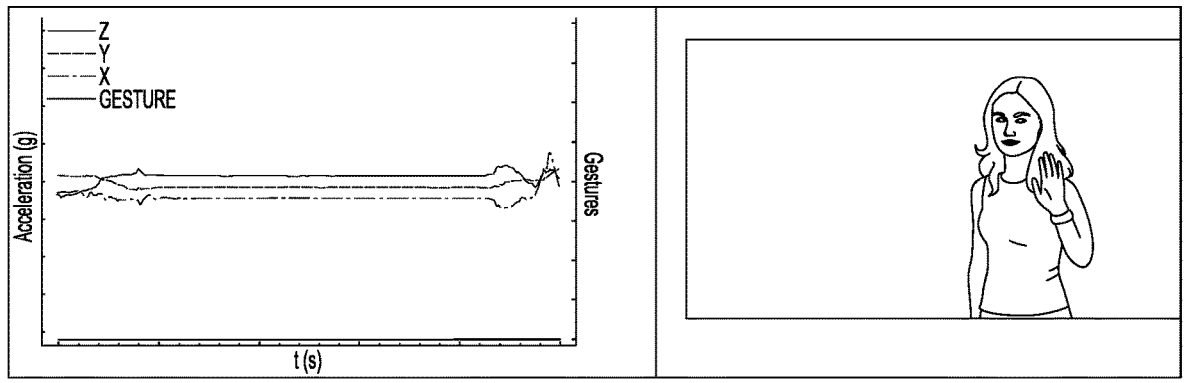
FIGS. 8A-8C illustrate operation of an accelerometer and gesture detector when detecting a hand wave gesture according to embodiments of the present disclosure.
Figure 8B:
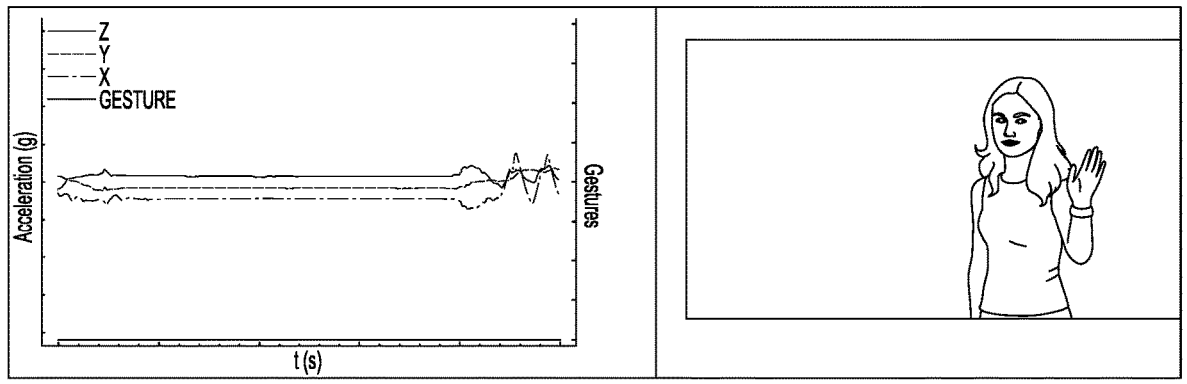
Figure 8C:
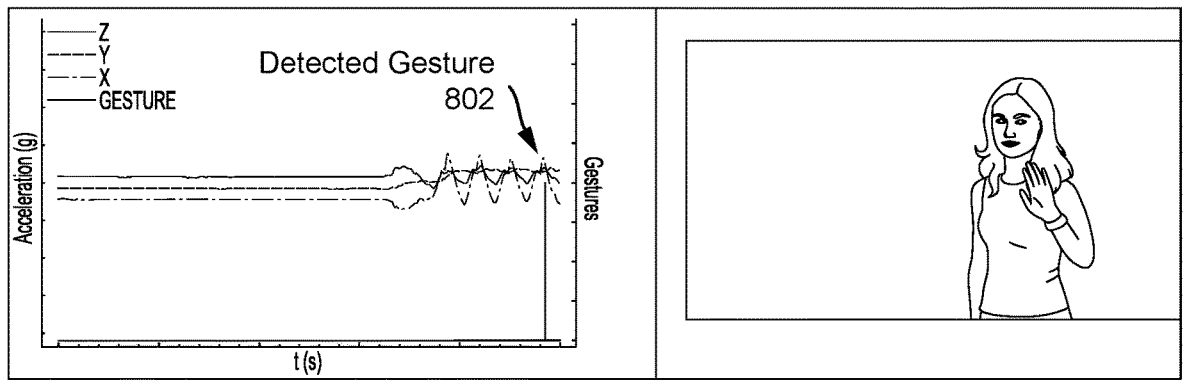

FIGS. 8A-8C illustrate operation of an accelerometer and gesture detector when detecting a hand wave gesture according to embodiments of the present disclosure. As can be seen, in FIG. 8A the user is beginning to wave her hand and the accelerometer captures motion data in three-axes shown on the left-hand side of the figure. As the user continues to move her hand back and forth as shown in FIGS. 8B and 8C, the accelerometer captures the corresponding motion data. Once the data is sufficient for the gesture detector CNN 420 to detect a wave gesture, it will output an indicator of the detected gesture 802. As shown on the right hand side of the graph, the vertical bar to the fourth hash mark represents the gesture detector CNN 420 outputting the indicator that the wave gesture was detected.

Figure 9A:
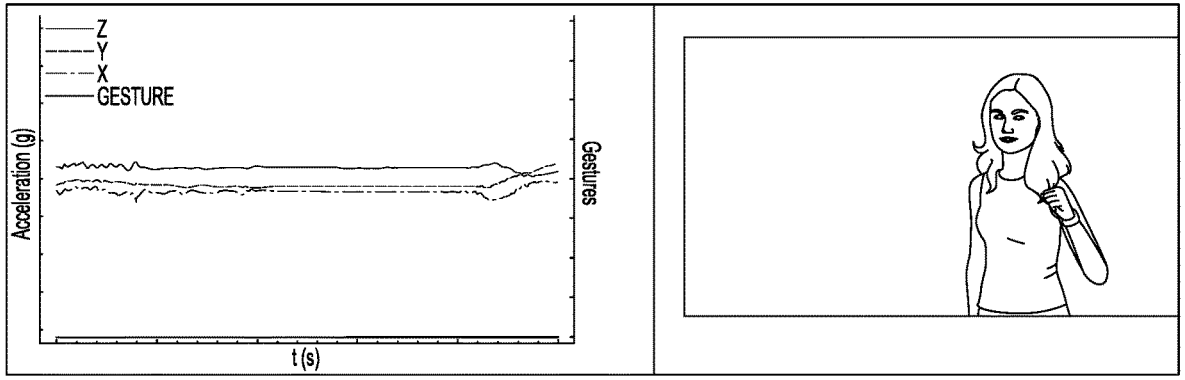
FIGS. 9A-9C illustrate operation of an accelerometer and gesture detector when detecting a push/punch gesture according to embodiments of the present disclosure.
Figure 9B:
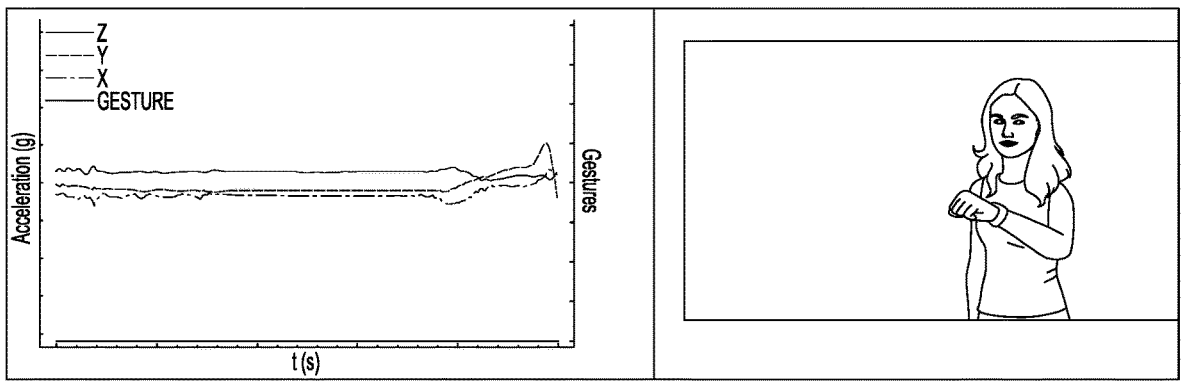
Figure 9C:
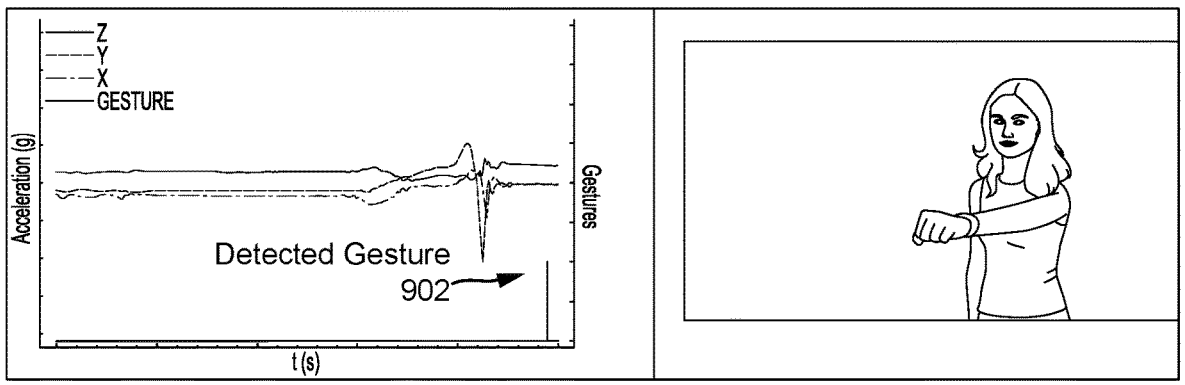

FIGS. 9A-9C illustrate operation of an accelerometer and gesture detector when detecting a push/punch gesture according to embodiments of the present disclosure. As can be seen, in FIG. 9A the user is beginning to move her forward and the accelerometer captures motion data in three-axes shown on the left-hand side of the figure. As the user continues to move her arm forward as shown in FIGS. 9B and 9C, the accelerometer captures the corresponding motion data. Once the data is sufficient for the gesture detector CNN 420 to detect a push/punch gesture, it will output an indicator of the detected gesture 902. As shown on the right hand side of the graph, the vertical bar to the second hash mark represents the gesture detector CNN 420 outputting the indicator that the push/punch gesture was detected.

Figure 10:
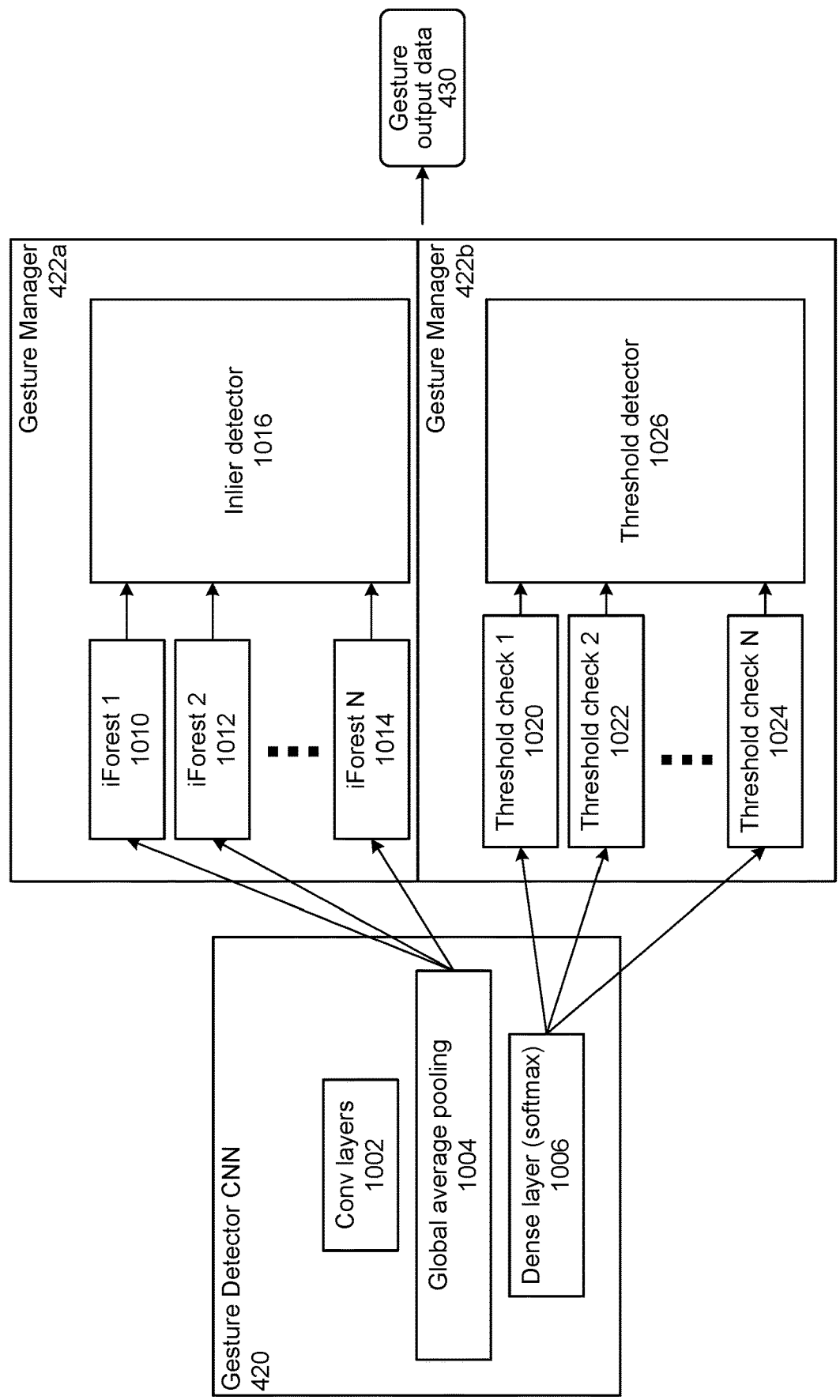
FIG. 10 illustrates components for operating of a gesture detector of a device using accelerometer data according to embodiments of the present disclosure.

FIG. 10 illustrates components for operating of a gesture detector of a device using accelerometer data according to embodiments of the present disclosure. Specifically, FIG. 10 illustrates two ways the gesture manager 422 may process data received from the gesture detector CNN 420 in order to determine that an active gesture has been detected for purposes of outputting gesture output data 430. The gesture detector CNN 420 may be trained to discriminate different gestures from each other based on learned features. As shown in FIG. 10, the gesture detector CNN 420 may include convolution layers 1002, a global average pooling layer 1004 and a dense layer/softmax 1006. Other layers/components of the gesture detector CNN 420 may also be included. Two different gesture manager 422 configurations, 422*a* and 422*b* may operate on different outputs from the gesture detector CNN 420 in order to interpret that output and determine if a gesture was properly detected. The device 110 may include on or both different gesture manager 422 configurations, 422*a* and 422*b*. Alternatively, a different gesture manager 422 configuration may be used by device 110.

In one example gesture manager 422*a*, the gesture detector CNN 420 outputs data from its global average pooling layer 1004. In this example configuration the gesture detector CNN 420 is treated as a feature extractor and multiple one-class classifiers (isolation forests (iForests) 1 through N (1010, 1012 . . . 1014) are trained for each gesture to potentially be detected. The iForests either accept or reject the motion samples as an inlier of each particular gesture.

Thus each iForest is associated with a single gesture and detects whether the motion data represented by the output of the global average pooling layer 1004 (which is a feature representation of the motion data input to the gesture detector CNN 420) indicates the motion is an anomaly/outlier for that gesture (e.g., gesture not detected) or the gesture is an inlier for that gesture (e.g., gesture is potentially detected). The inlier detector 1016 may then receive indicators from the iForests to identify which gestures were potentially detected and select from among them which of the gestures to indicate in the gesture output data 430. This may enable the inlier detector 1016 to select from gestures that have been activated and may remove some of the errors that may occur when using a universally trained gesture detector CNN 420 which is trained to detect from among multiple gestures and may not be configured to favor gestures that are active and disfavor gestures that are not active. The iForest arrangement of gesture manager 422*a* may allow independent detection of gestures using the iForests 1010-1014 and allow the inlier detector 1016 to select the highest scoring gesture that is active for the particular inference period. Thus, the gesture manager 422*a* may choose the active and detected gesture with the highest CNN score (which may be output by the dense layer 1006). If no gestures are detected, the gesture manager 422*a* may output a "no gesture" indicator or may not output any data.

In another example gesture manager 422*b*, the gesture detector CNN 420 outputs a plurality of scores from its output layer/dense layer 1006. Each of the scores may correspond to a particular gesture that the gesture detector CNN 420 is trained to detect. There may also be one category corresponding to "no gesture." Thus, if the gesture detector CNN 420 is trained to detect N gestures, it may output N+1 scores, Si through SN+1. The scores may resemble a probability density function but may not necessarily correspond to a confidence level for each respective gesture as the sum of the scores may be equal to 1. Each score may be sent to its appropriate threshold check component within gesture manager 422*b*, for example score 1 will go to threshold check 1 1020, score 2 will go to threshold check 2 1022, all the way through score N being sent to threshold check N 1024. The respective thresholds used by the threshold check components may be different from each other. The thresholds may be tuned to adjust the sensitivity and specificity of that gesture, for example being lowered when the gesture is active, particularly difficult to detect for a particular user, etc. If the respective score is above its respective threshold, the threshold detector 1026 will determine that the particular gesture has potentially been detected. Among the subset of gestures that have exceeded their thresholds, the threshold detector 1026 may select a single gesture to indicate in the gesture output data 430. That single gesture may include the gesture with the highest output score from the gesture detector CNN 420, effectively discarding the other scores. If the highest score corresponds to the "no gesture" category, the gesture manager 422*b* may output a "no gesture" indicator or may not output any data.

If both gesture manager configurations 422*a* and 422*b* are available to a device 110, the device 110 may also include logic to use data from both inlier detector 1016 and threshold detector 1026 to select a detected gesture and determine gesture output data 430.

Once a gesture is detected by the gesture detector 130, the gesture detector 130 may start a gesture cooldown 524. This begins a time period during which additional gestures may not be flagged and thus prevents the gesture manager 422 from flagging multiple gestures (e.g., flagging the same gesture) multiple times as a result of the same user movements.

As noted herein, a number of different techniques may be used to determine one or more gestures that are to be activated at a particular time. For example, a user walking in an amusement park or museum may wish to activate certain gestures that will lead to different experiences at different attractions/exhibitions. For example, if a user is in a particular room, gesture A may lead to response A (for example, a display board showing a message, a sound being output, a ride being moved, etc.) while gesture B may lead to a different response B while gestures C-F may not result in a response. Thus the system may want the device 110 to activate gestures A and B but not gestures C-F. (As noted above the device 110 may include a single gesture detection pipeline for all gestures or may include separate gesture detection components, e.g., gesture detection trained model 420, for different subsets of gestures that go with different rooms, attractions, amusement parks, etc. The device 110 may also have a different detection pipeline for always on gestures, such as tap gesture detector 120.)

Figure 11:
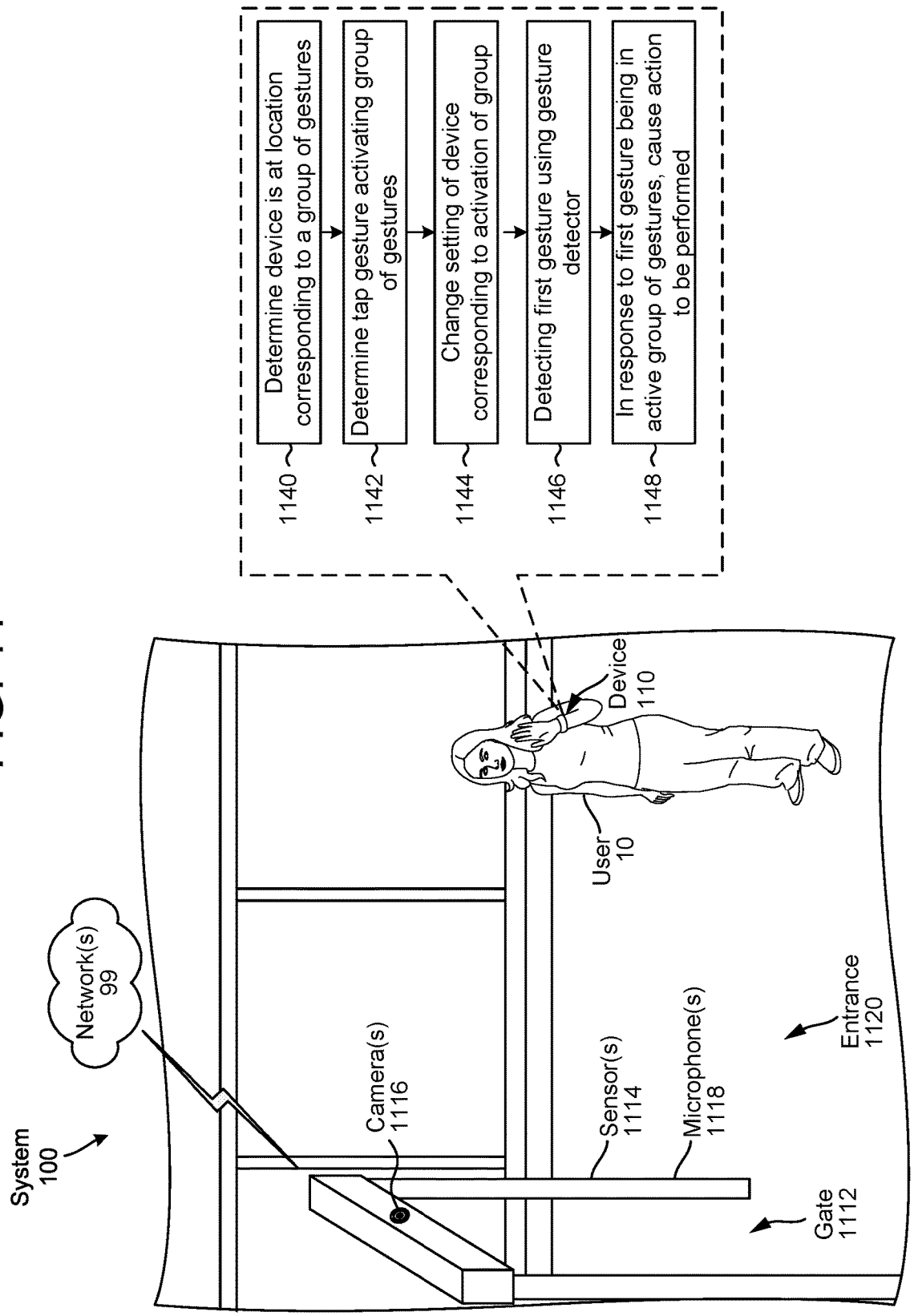
FIG. 11 illustrates activating detection of certain gestures of a device depending on a device location according to embodiments of the present disclosure.

FIG. 11 illustrates activating detection of certain gestures of a device depending on a device location according to embodiments of the present disclosure. As illustrated in FIG. 11, the system 100 may include device 110 communicatively coupled to a gate 1112, sensor(s) 1114, camera(s) 1116, microphone(s) 1118 and/or other devices (not shown) via network(s) 99. The gate 1112 may be located in an entrance 1120 and may include the sensor(s) 1114, the camera(s) 1116, and/or the microphone(s) 1118, and the entrance 20 may include multiple gates 1112 along with additional sensor(s) 1114, camera(s) 1116 and/or microphone(s) 1118 separate from the gates 1112. Each of the gate 1112, the sensor(s) 1114, the camera(s) 1116 and/or the microphone(s) 1118 may include a network adapter to communicate to the network(s) 99, although the disclosure is not limited thereto and the gate 1112, the sensor(s) 1114, the camera(s) 1116 and/or the microphone(s) 1118 may be connected to each other and/or another device that includes a network adapter without departing from the disclosure.

When the user 10 arrives to enter the location beyond the gate 1112, and is in proximity to an entrance (e.g., entrance 20) to the event, the system 100 may detect the user 10 using one or more techniques known to one of skill in the art (e.g., near field communication (NFC) technology, Bluetooth low energy (BLE), and/or radio frequency identification (RFID) technology using sensor(s) 1114, facial recognition using camera(s) 1116, voice recognition using microphone(s) 1118, etc.), may determine the account associated with the user 10, and may determine that the account has access to the event based on the indication. The system 100 may also determine which gestures are usable within the location the user is about to enter and may send a signal to the device 110 to enable those gestures.

The system 100 may also send/display a message that is detectable by the user 10 (for example on a public display board) that indicates that the user may activate certain gestures if the user wishes to use them in the location to activate certain activities within. For example, "Welcome to the park. To engage our fun activities, activate your gestures." The user 10 may then activate those gestures, for example by pressing a virtual button on their mobile device which in turn sends a message to device 110 to activate the gestures. In another example contextual gestures may be activated though performance of an always on gestures. For example, "Welcome to the park. To engage our fun activities, tap your wristband." The user 10 may then tap her device 110 (which may be detected using tap detector 120). The device 110 may detect the tap gesture which may in turn activate a group of contextual gestures to be detected by gesture detector 130.

The system 100 may also send a private message to a user 10 to allow them to activate gestures in a manner that may not be publicly known, for example only to a selected user. For example, the system 100 may send a message to the user's mobile device that says "Welcome to the park. To activate our special loyalty activities, press this button or double-tap your wristband." The user 10 may then perform the requested action to activate the special gestures available to the user 10. Execution of those gestures may lead to a variety of different actions such as unlocking special activities only available to certain users.

Thus, as shown in FIG. 11, the device may determine (1140) that the device is at a location corresponding to a group of gestures. This may occur using RFID identification, receiving a notification from system 100 to device 110, or through other mechanisms. The device 110 may determine (1142) a tap gesture (using tap detector 120) activating a group of contextual gestures. For example, the user double-tapping her wristband to activate the group of contextual gestures. The device 110 may change (1144) its settings to indicate that the group of gestures have been activated. For example changing data available to gesture manager 422 updating the state of the gestures in question. The device 110 may then detect (1146) a first gesture using the gesture detector 130. In response to that first gesture being in the active group of gestures, the device 110 may cause (1148) an action to be performed. This may involve sending gesture output data 430 to another component of the device 110 (e.g., a controller to activate a light, haptic output, etc.), to another component of the system 100 (for example, a device of an amusement park, museum, etc.), or the like.

FIGS. 12A-12D illustrates activating detection of certain gestures of a device depending on a user location according to embodiments of the present disclosure. The system 100 may be capable of detecting the user 10 and verify the user's account using one or more techniques known to one of skill in the art, such as facial recognition using camera(s) 1116, voice recognition using microphone(s) 1118, near field communication (NFC) technology, Bluetooth low energy (BLE), and/or radio frequency identification (RFID) technology using sensor(s) 1114, or the like.

Figure 12A:
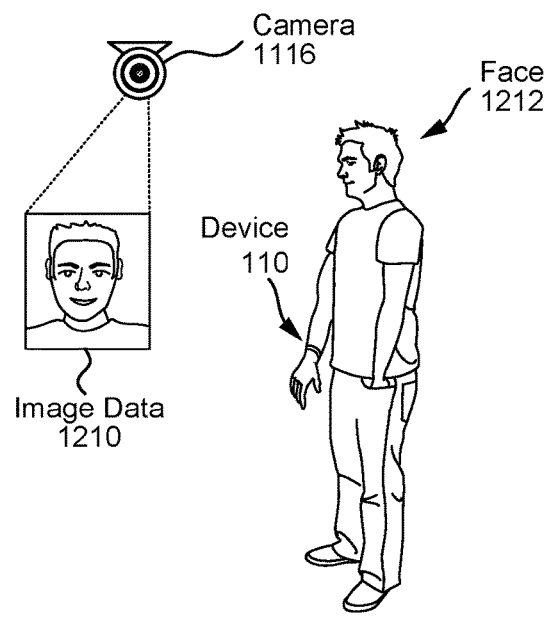
FIGS. 12A-12D illustrates activating detection of certain gestures of a device depending on a user location according to embodiments of the present disclosure.

FIG. 12A illustrates a first example in which the system 100 may capture image data 1210 using one or more camera(s) 1116, may perform facial recognition on the image data 1210 to identify a face 1212 associated with the user 10 and may determine the account associated with the user 10. In some examples, the system 100 may determine an identity of the user 10, although the disclosure is not limited thereto and the system 100 may verify the account without associating the face 1212 with the identity of the user 10. Using the facial recognition, the system 100 may verify the account associated with the user 10 and may determine the location of the user and device 110. The system 100 may then send a message to the device 110 or to another device (e.g., mobile device 1230) for purposes of activating one or more gestures.

Figure 12B:
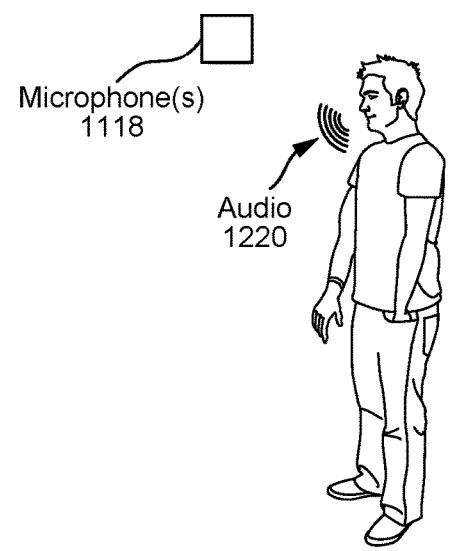

FIG. 12B illustrates a second example in which the system 100 may capture audio data corresponding to audio 1220 using one or more microphone(s) 1118 and may perform voice recognition on the audio data to identify the user 10 and/or to determine the account associated with the user 10 based on the user's voice represented in the audio data. In some examples the system 100 may determine an identity of the user 10, but the disclosure is not limited thereto and the system 100 may verify the account without associating the audio data with the identity of the user 10. Using the voice recognition, the system 100 may verify the account associated with the user 10 and may determine the location of the user and device 110. The system 100 may then send a message to the device 110 or to another device (e.g., mobile device 1230) for purposes of activating one or more gestures.

Figure 12C:
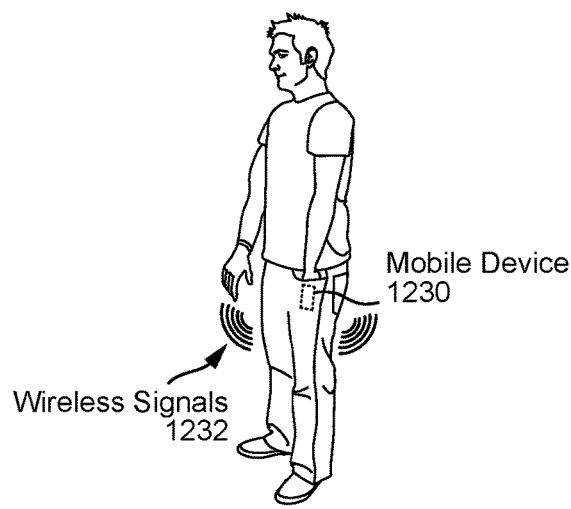

FIG. 12C illustrates a third example in which the system 100 may detect wireless signals 1232 (e.g., Near Field Communication (NFC) signals) from a mobile device 1230 (e.g., smartphone, etc.) and/or the device 110 associated with the user 10 and may verify the account associated with the user 10 based on the wireless signals 1232. In some examples, the system 100 may determine an identity of the user 10, although the disclosure is not limited thereto and the system 100 may verify the account without associating the wireless signals 1232 with the identity of the user 10. The system 100 may detect the wireless signals 1232 without requiring the user 10 to display the mobile device 1230 and/or remove the mobile device 1230 from a pocket, purse or the like. Using the wireless signals 1232, the system 100 may verify the account associated with the user 10 and may determine the location of the user and device 110. The system 100 may then send a message to the device 110 or to another device (e.g., mobile device 1230) for purposes of activating one or more gestures.

Figure 12D:
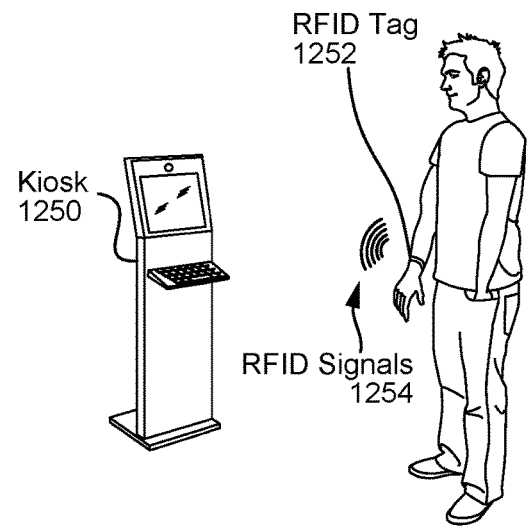

FIG. 12D illustrates a fourth example in which the system 100 may include a kiosk 1250 that enable the user 10 to identify the user 10 and/or the user's device 110 for example using an RFID tag 1252 (e.g., RFID component included in device 110 or the like) associated with the account. Additionally or alternatively, the system 100 may include mobile kiosks (not shown) carried by customer support personnel to provide assistance. The RFID tag 1252 may generate RFID signals 1254 and the system 100 may detect the RFID signals 1254 to verify the user's account, similar to the wireless signals 1232 described above. In some examples, the system 100 may determine an identity of the user 10 using the RFID signals 1254, although the disclosure is not limited thereto and the system 100 may verify the account without associating the RFID signals 1254 with the identity of the user 10. Using the RFID signals 1254, the system 100 may verify the account associated with the user 10 and may determine the location of the user and device 110. The system 100 may then send a message to the device 110 or to another device (e.g., mobile device 1230) for purposes of activating one or more gestures.

Figure 13:
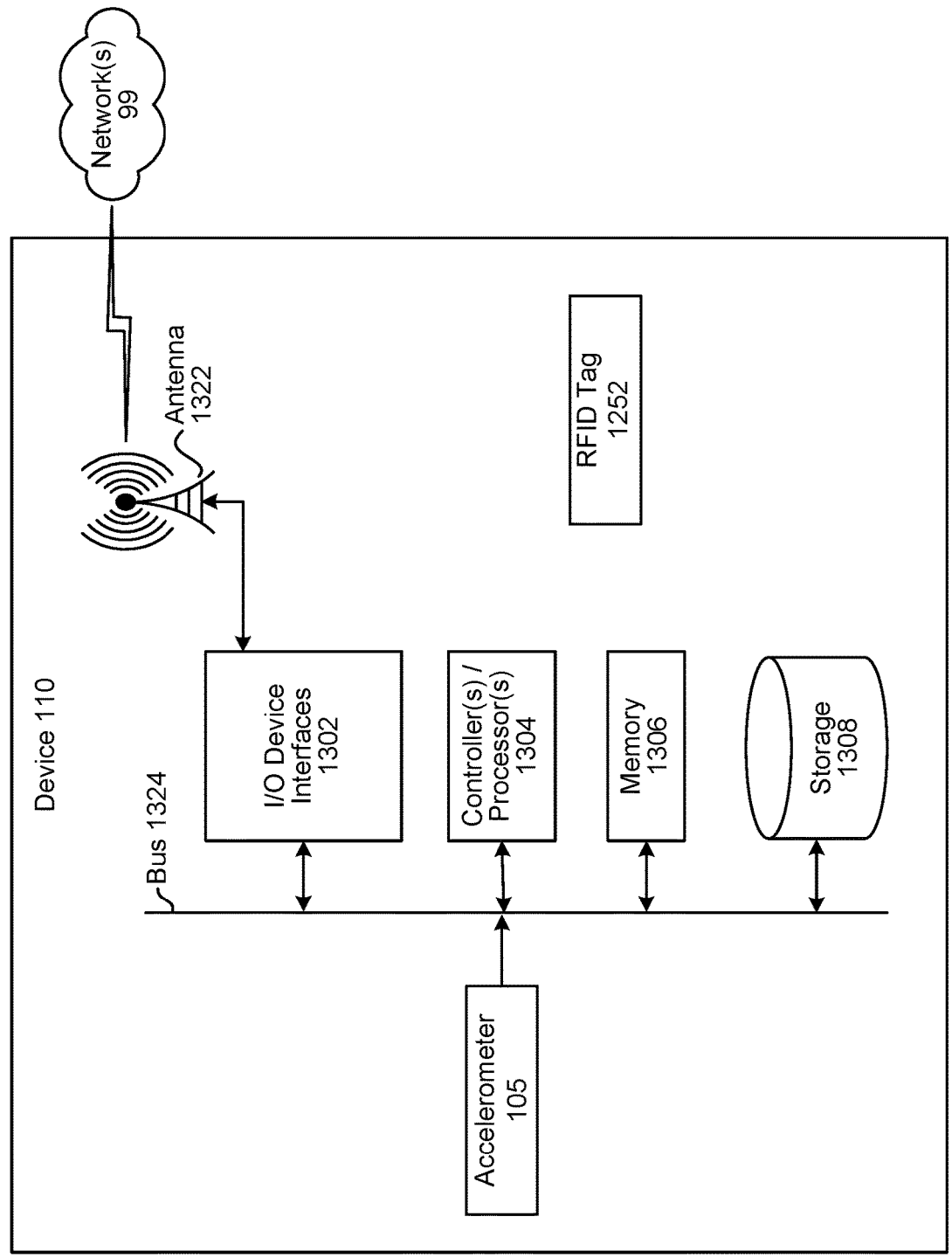
FIG. 13 is block diagram conceptually illustrating example components of a device according to embodiments of the present disclosure.

FIG. 13 is a block diagram conceptually illustrating components of a device 110 that may be used with the described system 100. Multiple such devices 110 may be included in the system without departing from the disclosure.

In operation, the device 110 may include computer-readable and computer-executable instructions. The device 110 may be an electronic device capable of detecting tap inputs and other gestures as described herein. The device 110 may be part of a wearable device (for example, as part of a wristband, armband, ring, etc.). The device 110 may also be in other forms depending on device and/or system configuration.

As illustrated in FIG. 13, the device 110 may include an address/data bus 1324 for conveying data among components of the device 110. Each component within the device

110 may also be directly connected to other components in addition to (or instead of) being connected to other components across the bus 1324.

The device 110 may include one or more controllers/processors 1304, that may each include a central processing unit (CPU) for processing data and computer-readable instructions, and a memory 1306 for storing data and instructions. The memory 1306 may include volatile random access memory (RAM), non-volatile read only memory (ROM), non-volatile magnetoresistive (MRAM) and/or other types of memory. The device 110 may also include a data storage component 1308, for storing data and controller/processor-executable instructions (e.g., instructions to perform the algorithm illustrated in FIGS. 1, 2, 3, and/or 5). The data storage component 1308 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1302. The device 110 may also include, either as hardware, firmware, software, etc. components illustrated herein such as those illustrated in FIGS. 2, 4, and/or 10. The device 110 may also include an RFID tag 1252 for purposes of allowing RF detection of the device 110, such as that discussed herein. The device 110 may also include a batter, not shown. The device 110 may also include other components not shown such as a light (which may include a light emitting diode (LED)), haptic output component, loudspeaker (for outputting a beep), or other output component. Activation of such components may be caused as an action in response to detecting a gesture as described herein.

The device 110 includes input/output device interfaces 1302. A variety of components may be connected through the input/output device interfaces 1302, such as, speakers (not shown), a display (not shown), a camera (not shown), microphone (not shown), etc. However, the disclosure is not limited thereto and the device 110 may include integrated speakers, display, camera, microphone, etc.

The input/output device interfaces 1302 may be configured to operate with a network(s) 99, for example a wired local area network (LAN), a wireless local area network (WLAN) (such as Wi-Fi), Bluetooth, ZigBee and/or wireless networks, such as a Long Term Evolution (LTE) network, WiMAX network, 3G network, etc. The network(s) 99 may include a local or private network or may include a wide network such as the internet. Devices may be connected to the network(s) 99 through either wired or wireless connections.

The input/output device interfaces 1302 may also include an interface for an external peripheral device connection such as universal serial bus (USB), FireWire, Thunderbolt, Ethernet port or other connection protocol that may connect to network(s) 99. The input/output device interfaces 1302 may also include a connection to an antenna (not shown) to connect one or more network(s) 99 via an Ethernet port, a wireless local area network (WLAN) (such as WiFi) radio, Bluetooth, Bluetooth low energy (BLE), and/or wireless network radio, such as a radio capable of communication with a wireless communication network such as a Long Term Evolution (LTE) network, WiMAX network, 3G network, etc.

Some or all of the controllers/modules of the progress module 1324 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 1304, using the memory 1306 as temporary "working" storage at runtime. The executable instructions may be stored in a non-transitory manner in non-volatile memory 1306, storage 1308, or an external device. Alternatively, some or all of the executable instructions may be embedded in hardware or firmware in addition to or instead of software.

The device 110 includes an accelerometer XXA05 which may measure movement in three dimensions. The accelerometer XXA05 may include a three-axis accelerometer capable of measuring linear acceleration about three dimensions (e.g., x-, y-, and z-axis).

The components of the device 110, as illustrated in FIG. 13, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method to detect a gesture involving a wearable device, the method comprising:
   receiving, from an accelerometer of the wearable device, first motion data;
   processing the first motion data using a first high-pass filter to determine first filtered motion data;
   processing the first motion data using a second high-pass filter to determine second filtered motion data, the second high-pass filter corresponding to a lower cutoff frequency than the first high-pass filter;
   determining that a first buffer includes a first number of samples of the second filtered motion data;
   determining the first filtered motion data satisfies an amplitude trigger;
   in response to the first filtered motion data satisfying the amplitude trigger and to the first buffer including the first number of samples, detecting a first touch input to the wearable device by processing the second filtered motion data using a first convolutional neural network (CNN); and
   causing a first action to be performed in response to the first touch input.

2. The computer-implemented method of claim 1, wherein causing the first action to be performed comprises incrementing a counter to a value of one and the method further comprises:
   receiving, from the accelerometer, second motion data;
   processing the second motion data using the second high-pass filter to determine third filtered motion data;
   processing the third filtered motion data using the first CNN to detect a second touch input of the wearable device;
   incrementing the counter to a value of two;
   determining that a third touch input was not detected within a time period from the second touch input;
   determining that a double-touch gesture was performed; and
   causing a second action to be performed in response to the double-touch gesture.

3. The computer-implemented method of claim 1, further comprising:
   receiving, from the accelerometer, second motion data;
   downsampling the second motion data to determine downsampled motion data;
   determining the downsampled motion data satisfies a motion trigger;
   in response to the downsampled motion data satisfying the motion trigger, processing the downsampled motion data using a second CNN to detect a first gesture; and
   causing a second action to be performed in response to the first gesture.

4. The computer-implemented method of claim 3, wherein the second CNN is configured to detect a plurality of gestures and the method further comprises:
   determining that the wearable device is at a location corresponding to a first subset of gestures of the plurality of gestures, the first subset including the first gesture;
   determining the first touch input corresponds to activation of the first subset; and
   changing a setting of the wearable device corresponding to activation of the first subset,
   wherein causing the second action to be performed is further in response to the first gesture being in an active state.

5. A computer-implemented method, comprising:
   receiving first motion data from an accelerometer of a device;
   determining first filtered motion data using the first motion data;
   determining second filtered motion data using the first motion data, the second filtered motion data corresponding to a different data range than the first filtered motion data;
   determining the first filtered motion data satisfies an amplitude trigger; and
   processing the second filtered motion data using a first trained model to detect a first touch input of the device.

6. The computer-implemented method of claim 5, wherein:
   determining the first filtered motion data comprises processing the first motion data using a first high-pass filter having a first cutoff frequency; and
   determining the second filtered motion data comprises processing the first motion data using a second high-pass filter, the second high-pass filter having a second cutoff frequency lower than the first cutoff frequency.

7. The computer-implemented method of claim 5, further comprising:
   incrementing a counter in response to detection of the first touch input;
   receiving second motion data from the accelerometer;
   determining third filtered motion data using the second motion data;
   determining fourth filtered motion data using the second motion data, the fourth filtered motion data corresponding to the different data range;
   determining the third filtered motion data satisfies the amplitude trigger;

processing the fourth filtered motion data using the first trained model to detect a second touch input of the device; and incrementing the counter in response to detection of the second touch input.

8. The computer-implemented method of claim 7, further comprising:

prior to allowing processing of the fourth filtered motion data, waiting a first time period from detection of the first touch input.

9. The computer-implemented method of claim 5, further comprising:

determining that a second touch input was not detected within a time period from the first touch input;

in response to the second touch input not being detected within the time period and a value of a counter, determining that a touch gesture was performed; and causing an action to be performed in response to the touch gesture.

10. The computer-implemented method of claim 5, further comprising:

determining a first buffer includes a first number of samples of the second filtered motion data, wherein processing the second filtered motion data using the first trained model is performed at least in part in response to the first buffer including the first number of samples.

11. The computer-implemented method of claim 5, further comprising:

determining the first filtered motion data includes, within a first data range, a peak amplitude value;

determining a delay period corresponding to a position of the peak amplitude value within the first data range; and delaying processing of the second filtered motion data based at least in part on the delay period.

12. The computer-implemented method of claim 5, further comprising:

receiving second motion data from the accelerometer; and based at least in part on the second motion data, using a second trained model to detect a first gesture.

13. A system comprising:

at least one processor; and at least one memory component including instructions operable to be executed by the at least one processor to configure the system to:

receive first motion data from an accelerometer of a device;

determine first filtered motion data using the first motion data;

determine second filtered motion data using the first motion data, the second filtered motion data corresponding to a different data range than the first filtered motion data;

determine the first filtered motion data satisfies an amplitude trigger; and process the second filtered motion data using a first trained model to detect a first touch input of the device.

14. The system of claim 13, wherein:

the instructions that configure the system to determine the first filtered motion data comprise instructions that, when executed by the at least one processor, further configure the system to process the first motion data using a first high-pass filter having a first cutoff frequency; and the instructions that configure the system to determine the second filtered motion data comprise instructions that, when executed by the at least one processor, further configure the system to process the first motion data using a second high-pass filter, the second high-pass filter having a second cutoff frequency lower than the first cutoff frequency.

15. The system of claim 13, wherein the at least one memory component further includes instructions that, when executed by the at least one processor, further configure the system to:

increment a counter in response to detection of the first touch input;

receive second motion data from the accelerometer;

determine third filtered motion data using the second motion data;

determine fourth filtered motion data using the second motion data, the fourth filtered motion data corresponding to the different data range;

determine the third filtered motion data satisfies the amplitude trigger;

process the fourth filtered motion data using the first trained model to detect a second touch input of the device; and increment the counter in response to detection of the second touch input.

16. The system of claim 15, wherein the at least one memory component further includes instructions that, when executed by the at least one processor, further configure the system to:

prior to allowing processing of the fourth filtered motion data, wait a first time period from detection of the first touch input.

17. The system of claim 13, wherein the at least one memory component further includes instructions that, when executed by the at least one processor, further configure the system to:

determine that a second touch input was not detected within a time period from the first touch input;

in response to the second touch input not being detected within the time period and a value of a counter, determine that a touch gesture was performed; and cause an action to be performed in response to the touch gesture.

18. The system of claim 13, wherein the at least one memory component further includes instructions that, when executed by the at least one processor, further configure the system to:

determine a first buffer includes a first number of samples of the second filtered motion data, wherein processing the second filtered motion data using the first trained model is performed at least in part in response to the first buffer including the first number of samples.

19. The system of claim 13, wherein the at least one memory component further includes instructions that, when executed by the at least one processor, further configure the system to:

determine the first filtered motion data includes, within a first data range, a peak amplitude value;

determine a delay period corresponding to a position of the peak amplitude value within the first data range; and delay processing of the second filtered motion data based at least in part on the delay period.

20. The system of claim 13, wherein the at least one memory component further includes instructions that, when executed by the at least one processor, further configure the system to:
 receive second motion data from the accelerometer; and
 based at least in part on the second motion data, use a second trained model to detect a first gesture.

* * * * *